United States Patent
Niles et al.

(10) Patent No.: US 8,957,314 B2
(45) Date of Patent: Feb. 17, 2015

(54) APPARATUS AND METHOD FOR PROTECTING A COMPONENT OF AN ELECTRICAL POWER TRANSMISSION SYSTEM

(75) Inventors: Martin S. Niles, Stony Plain (CA); Keith I. Yeats, Red Deer (CA); Leo Morin, Edmonton (CA); Robert A. Nissen, Edmonton (CA)

(73) Assignee: Cantega Technologies Inc., Edmonton, Alberta (CA)

( * ) Notice: Subject to any disclaimer, the term of this patent is extended or adjusted under 35 U.S.C. 154(b) by 67 days.

(21) Appl. No.: 13/022,186

(22) Filed: Feb. 7, 2011

(65) Prior Publication Data

US 2011/0192627 A1    Aug. 11, 2011

Related U.S. Application Data

(60) Provisional application No. 61/302,044, filed on Feb. 5, 2010.

(51) Int. Cl.
| | |
|---|---|
| H01B 17/42 | (2006.01) |
| H02B 1/06 | (2006.01) |
| H02G 1/02 | (2006.01) |
| H02G 7/00 | (2006.01) |
| H01R 4/70 | (2006.01) |
| H01B 17/00 | (2006.01) |

(52) U.S. Cl.
CPC ....................................... *H02G 7/00* (2013.01)
USPC ................... 174/140 H; 174/5 R; 174/138 F; 174/172; 174/155; 174/158 R

(58) Field of Classification Search
USPC .............. 174/5 R, 138 F, 135, 139, 172, 155, 174/158 R, 140 H
See application file for complete search history.

(56) References Cited

U.S. PATENT DOCUMENTS

| | | | | |
|---|---|---|---|---|
| 2,408,132 | A | * | 9/1946 | Weeks .......................... 296/223 |
| 3,824,676 | A | | 7/1974 | Ebert |
| 4,709,121 | A | * | 11/1987 | Shores .......................... 174/375 |
| 5,153,383 | A | | 10/1992 | Whited et al. |

(Continued)

FOREIGN PATENT DOCUMENTS

WO          9734306          9/1997

OTHER PUBLICATIONS

"Bus Insulation and Wildlife Protection Products: BCAC", brochure published by Tyco Electronics Corporation as early as 2004.

*Primary Examiner* — Hoa C Nguyen
*Assistant Examiner* — Binh Tran
(74) *Attorney, Agent, or Firm* — Anthony R. Lambert

(57) ABSTRACT

An apparatus and method are disclosed for protecting a component of an electrical power transmission system. The apparatus comprises: a dielectric cover having opposed portions that define a component enclosing space when in a closed position; the dielectric cover having an open position in which enclosing edges of the opposed portions are spaced to allow entry of the component between the enclosing edges into the dielectric cover; and a spreader, connected to the opposed portions for moving the opposed portions into the closed position, and having a tool connector for operation of the spreader by a tool. The spreader may be configured to exert positive control in use to hold the opposed portions in position over a range of positions between the closed position and an open position.

31 Claims, 18 Drawing Sheets

(56) References Cited

U.S. PATENT DOCUMENTS

| | | |
|---|---|---|
| 5,485,307 A | 1/1996 | Kim |
| 6,255,597 B1 | 7/2001 | Bowling et al. |
| 6,291,774 B1 | 9/2001 | Williams |
| 6,303,870 B1 | 10/2001 | Nazaryan et al. |
| 6,486,785 B1 | 11/2002 | Hoth |
| 6,995,313 B1 | 2/2006 | Barnett et al. |
| 7,075,015 B1 | 7/2006 | Rauckman |
| 7,154,034 B2 | 12/2006 | Lynch |
| 2003/0015330 A1 | 1/2003 | Wood et al. |
| 2008/0123254 A1 | 5/2008 | Niles |
| 2011/0083896 A1 | 4/2011 | Hiller et al. |

\* cited by examiner

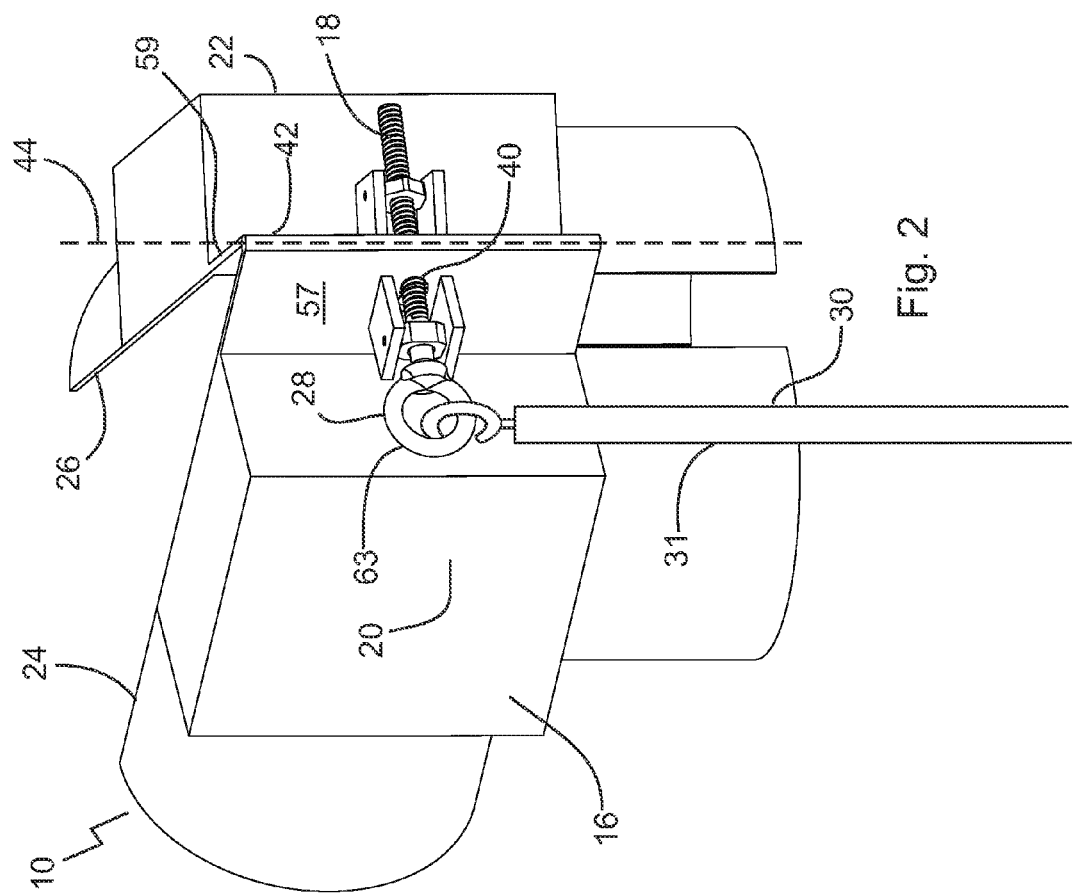
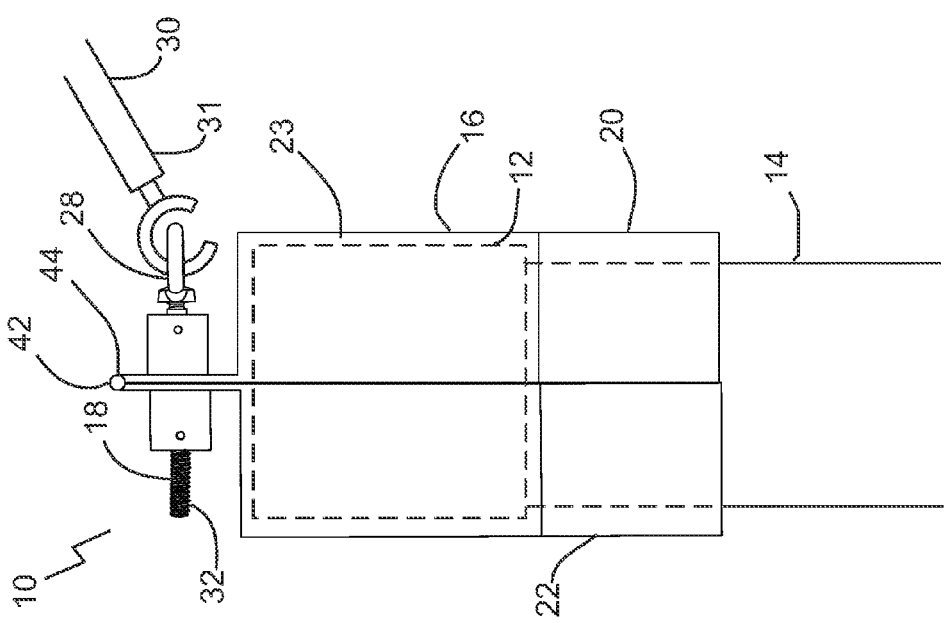

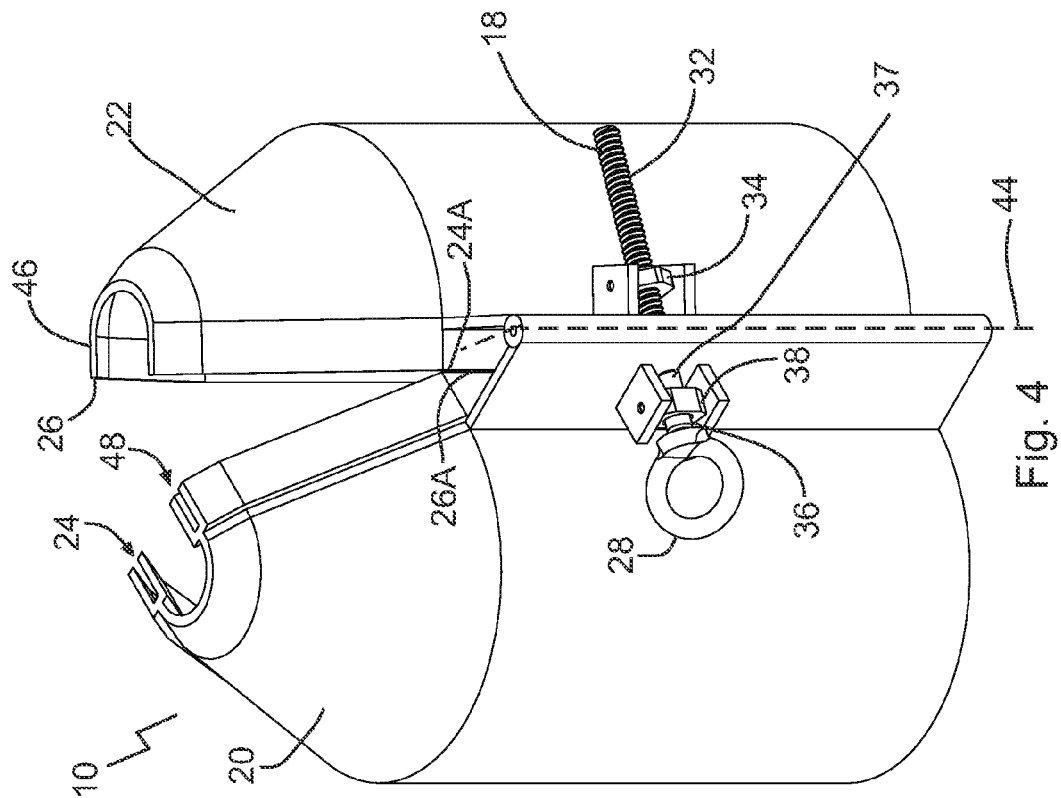
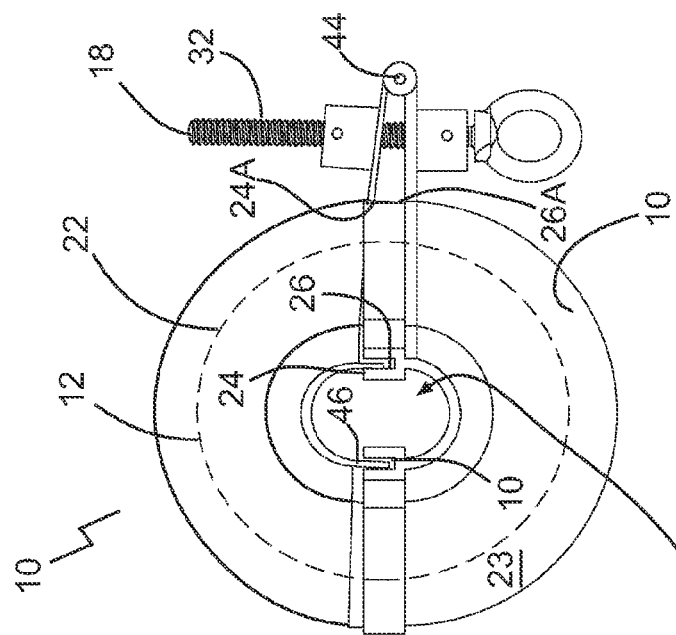

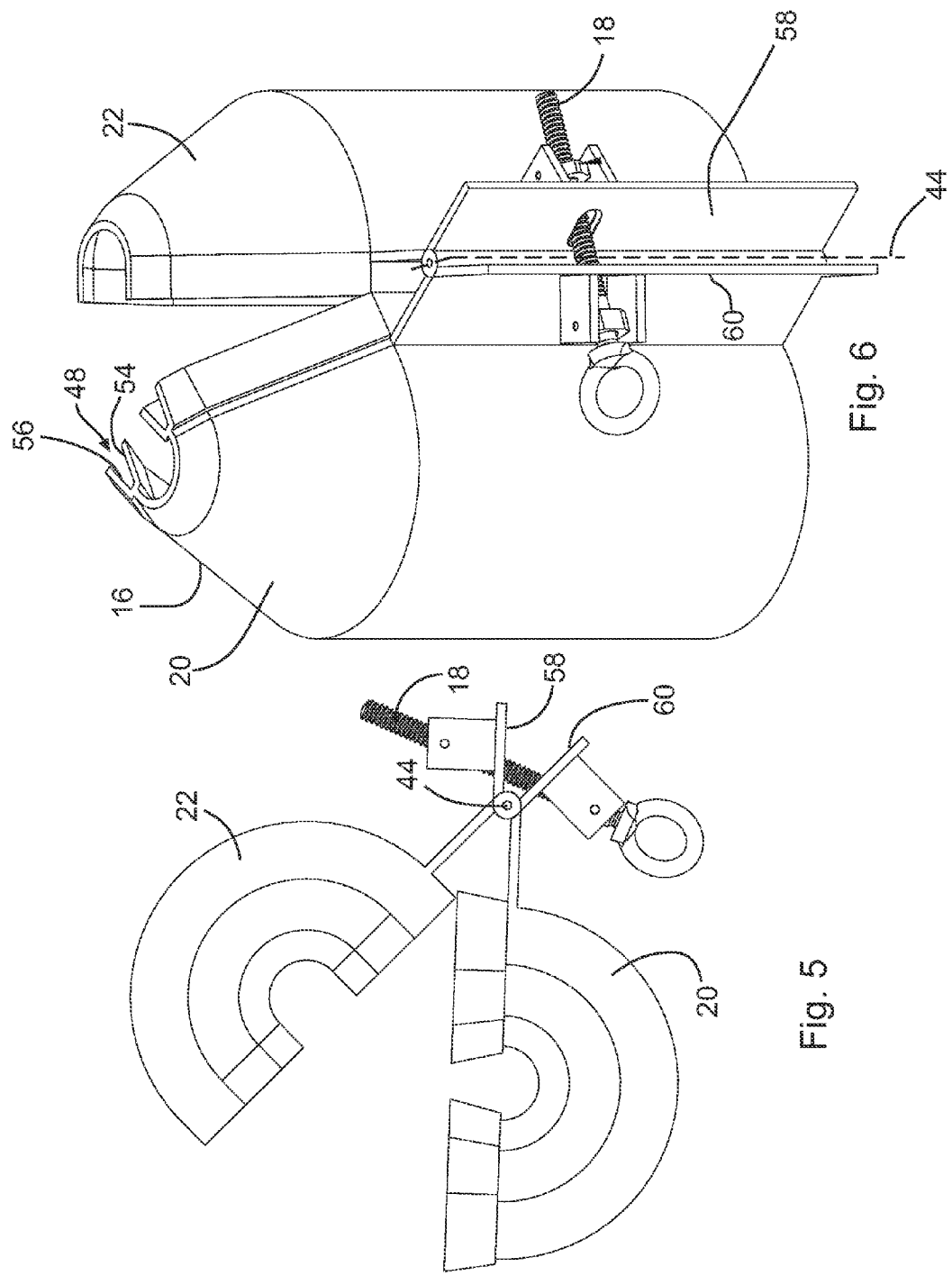

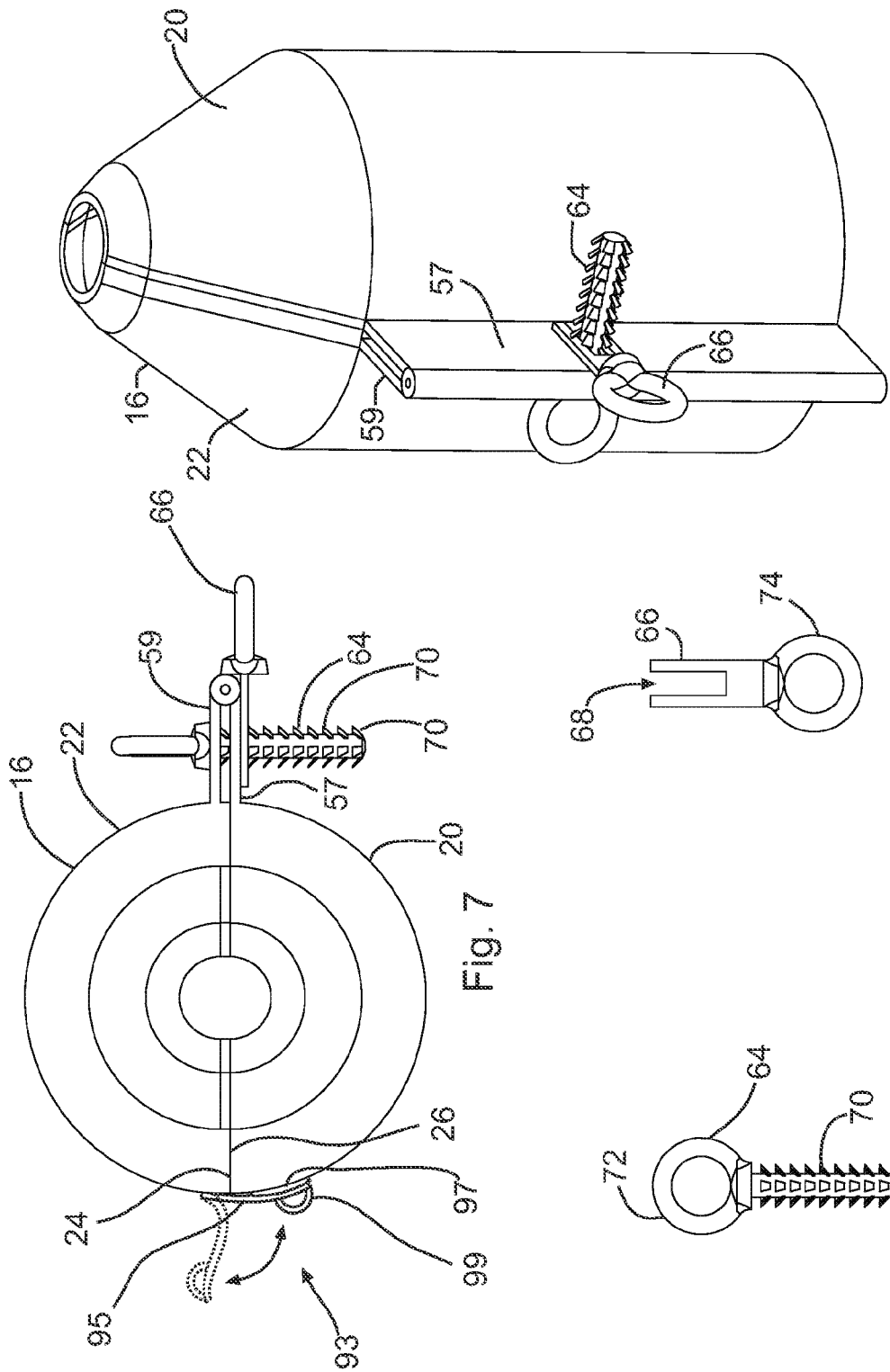

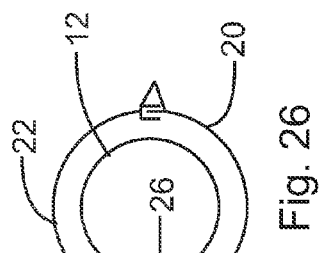
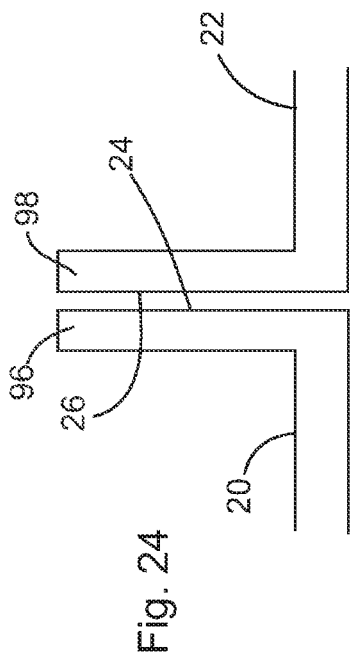
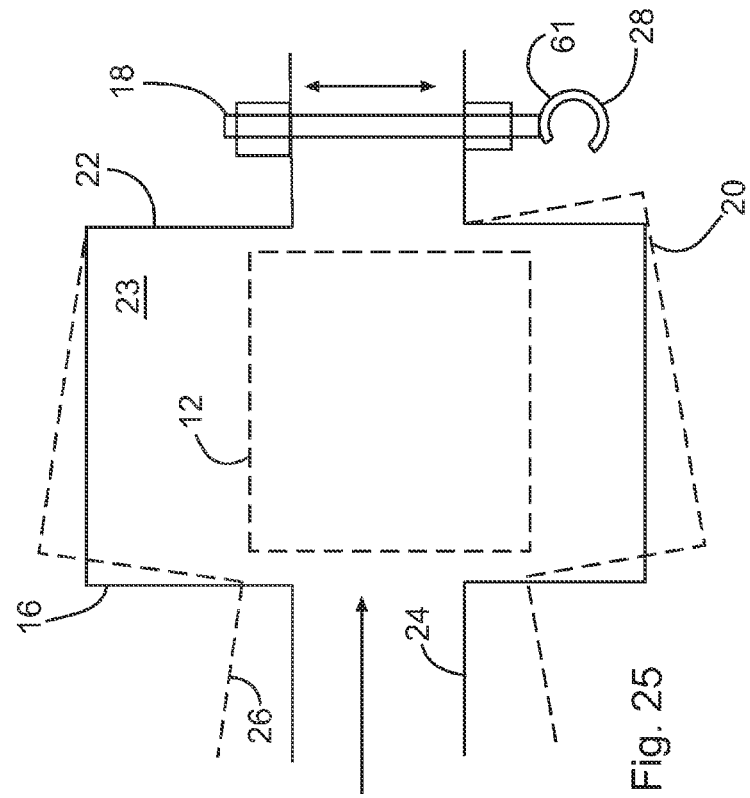

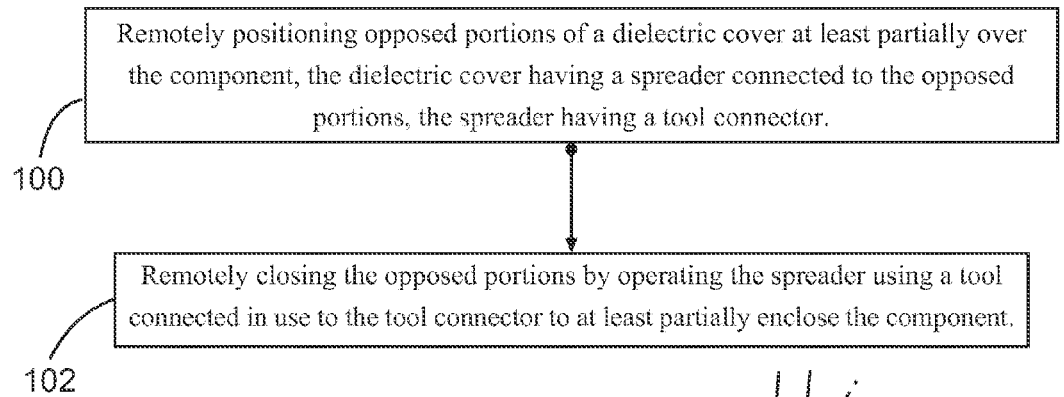
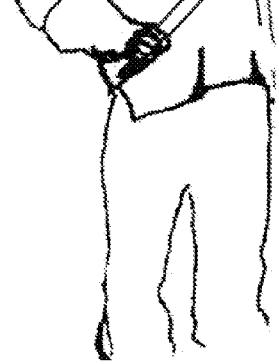
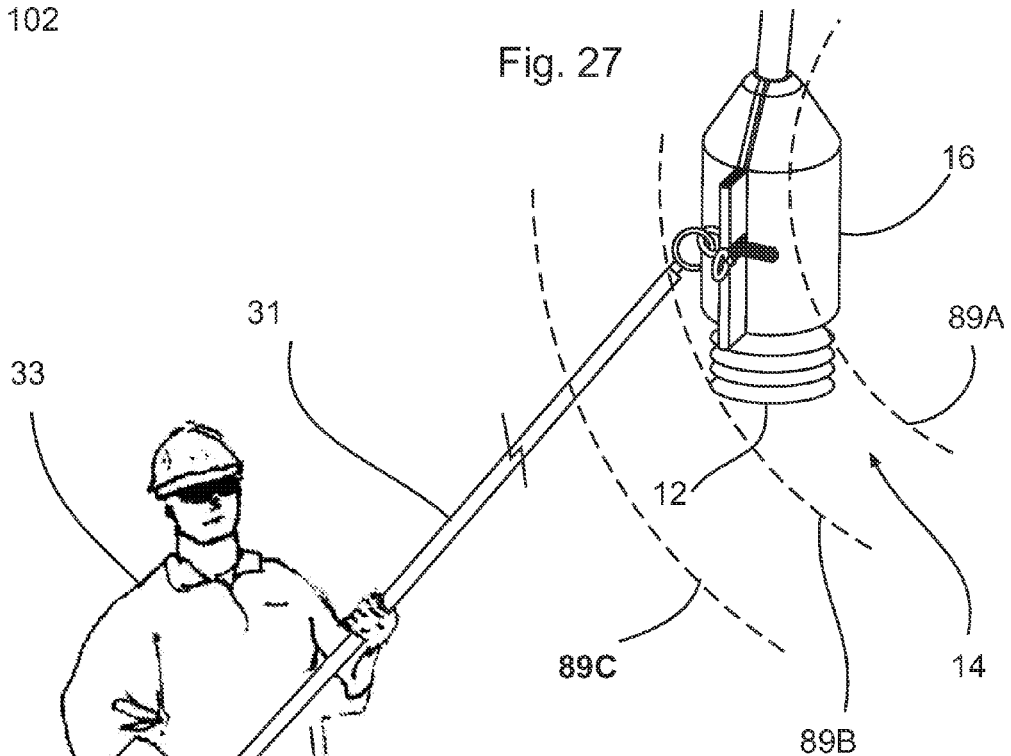
Fig. 27
Fig. 28

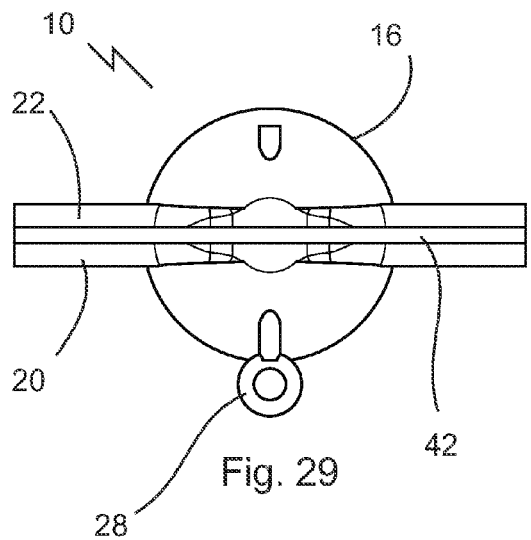
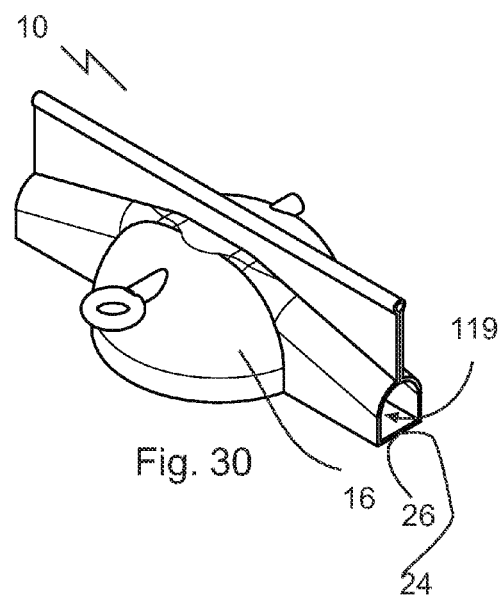
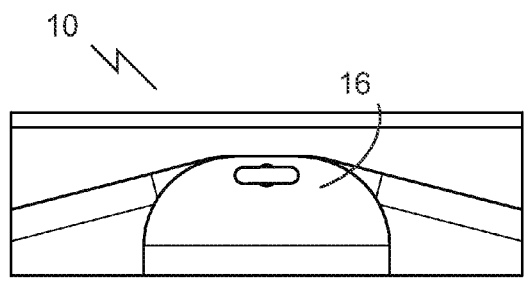
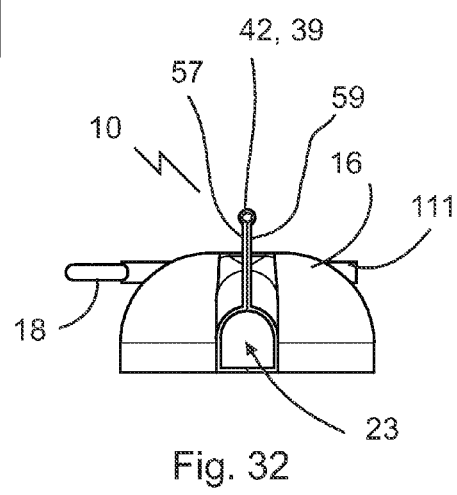

US 8,957,314 B2

APPARATUS AND METHOD FOR PROTECTING A COMPONENT OF AN ELECTRICAL POWER TRANSMISSION SYSTEM

CROSS-REFERENCE TO RELATED APPLICATIONS

This application claims the benefit under 35 USC 119(e) of U.S. provisional application Ser. No. 61/302,044 filed Feb. 5, 2010.

TECHNICAL FIELD

This document discloses an apparatus and method for protecting a component of an electrical power transmission system.

BACKGROUND

The apparatus and method disclosed here relate to the field of electrical power transmission and distribution and the need to insulate electrical power systems from short circuits caused by birds and other animals. There exists a variety of covers used to insulate components of electrical power systems from animals and birds. Hinged two-piece covers and one-piece snap on covers are examples. These covers may be installed remotely by two or more users.

SUMMARY

An apparatus is disclosed for protecting a component of an electrical power transmission system, the apparatus comprising: a dielectric cover having opposed portions that define a component enclosing space at least when in a closed position; and the dielectric cover having a spreader connected to the opposed portions for positively moving the opposed portions through a range of positions from open to closed, the spreader having a tool connector for operation of the spreader by a tool.

A method is also disclosed for protecting a component of an electrical power transmission system, the method comprising: remotely positioning opposed portions of a dielectric cover at least partially over the component, and positively moving the opposed portions through a range of positions from open to closed. Control of the spreader may be provided by a tool such as a hotstick.

An apparatus for protecting a component of an electrical power transmission system is also disclosed, the apparatus comprising: a dielectric cover having opposed portions that define a component enclosing space at least when in a closed position; and the dielectric cover having a spreader connected to the opposed portions for moving the opposed portions through a range of positions from open to closed, the spreader having a tool connector for operation of the spreader by a tool.

In some embodiments, an apparatus and method are disclosed for installing wildlife protective covers on a component of an energized electrical system by a single user located outside the Limits of Approach. In other embodiments more than one user may install a cover. In some embodiments, there is disclosed an apparatus and method that allows a single user, located outside the Limits of Approach, to successfully install a wildlife protective cover using a single hotstick and to easily remove that cover from an energized system without deenergizing the system. In other embodiments more than one user located outside the Limits of Approach may install and remove the cover without deenergizing the system. In some embodiments a wildlife protective cover is provided that gives a user positive control (the ability to precisely control the movement and position of portions of the cover relative to one another and to the surrounding space) during installation.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 1 and 2 are top plan and perspective views, respectively, of one embodiment of dielectric cover for protecting a component of an electrical power transmission system.

FIG. 1 illustrates the cover in a closed position over a component, and

FIG. 2 illustrates the cover in an open position.

FIGS. 3 and 4 are top plan and perspective views, respectively, of another embodiment of a dielectric cover for protecting a component of an electrical power transmission system.

FIGS. 5 and 6 are bottom plan and perspective views, respectively, of another embodiment of a dielectric cover for protecting a component of an electrical power transmission system.

FIGS. 7 and 10 are bottom plan and perspective views, respectively, of an embodiment of a dielectric cover for protecting a component of an electrical power transmission system, the apparatus having a pin and lock spreader;

FIGS. 8 and 9 are top plan views of the pin and lock, respectively, used with the dielectric cover of FIG. 7.

FIG. 11 is a partial cutaway view;

FIG. 24 is a section view of enclosing edges of an embodiment of the dielectric cover.

FIG. 25 is a section view of another embodiment of a dielectric cover for protecting a component of an electrical power transmission system, showing installation of the cover over a component.

FIG. 26 is a section view of another embodiment of a dielectric cover for protecting a component of an electrical power transmission system, where the enclosing edges of the opposed portions do not touch in the closed position.

FIG. 27 is a flow diagram of a method of protecting a component of an electrical power transmission system.

FIG. 28 is a perspective view of a method of remote installation of a cover onto a component of an energized electrical power transmission system.

FIGS. 29-32 are top plan, perspective, side elevation and end elevation views, respectively, of an embodiment of a dielectric cover for protecting a pin-style pole top insulator.

DETAILED DESCRIPTION

Figure 12:
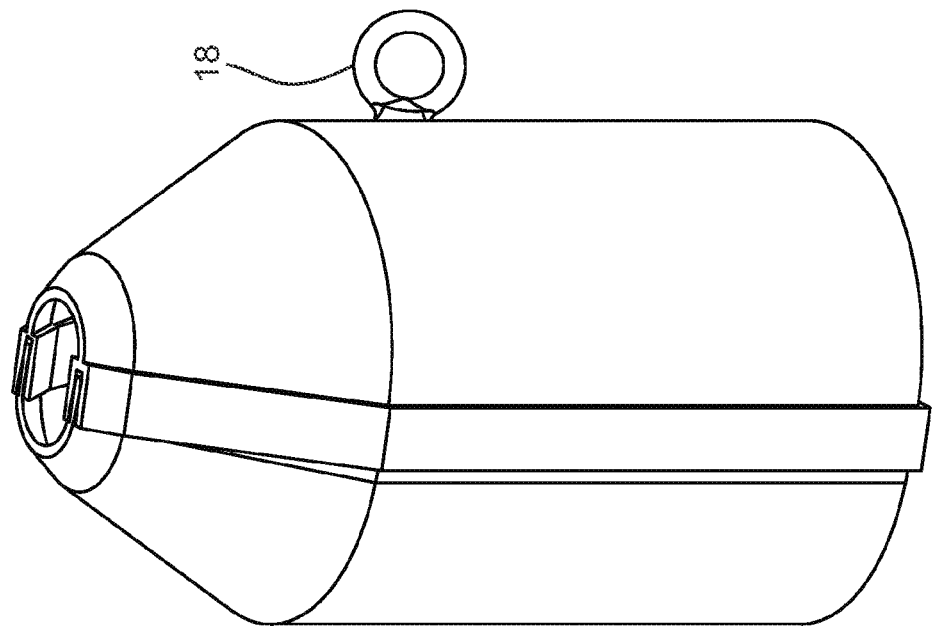
FIGS. 11 and 12 are perspective views of another embodiment of a dielectric cover for protecting a component of an electrical power transmission system, where the spreader is located inside the cover. Of note.

Immaterial modifications may be made to the embodiments described here without departing from what is covered by the claims.

Long-distance electricity transmission is typically carried with high voltage conductors. Transmission at higher voltages reduces resistance power loss, therefore line voltage for long distance lines is stepped up after generation by passing it through transformer stations prior to feeding the power to long-distance transmission lines. Transmission lines traverse large regions and require numerous support towers. The conductors in high tension powerlines are typically uninsulated because of the cost and additional weight of insulated versus uninsulated conductors. Because clearances between adjacent energized elements, and energized and grounded elements, are generally large in transmission systems, these systems generally are not at risk for animal-caused faults or outages.

Substations transform power from transmission voltages to distribution voltages, typically ranging from 2400 volts to 37,500 volts. Distribution voltages allow for reduced system clearances. These reduced clearances between phase to ground and phase to phase, increase system susceptibility to bird or animal caused outages. Electric poles, towers, and other electrical equipment including substations may provide attractive roosts for birds, particularly in treeless regions. If the wings of a bird simultaneously contact a conductor and another object such as an adjacent conductor, support tower or tree, the resulting electrical short-circuit can kill the bird and also damage the power system. The electrical short circuit can further cause electrical system damage resulting in power outages.

Further, the nesting of birds in open cavities in electrical systems increases the risk that predators will be attracted to the nests and cause a power fault or outage. Predators can be mammals such as raccoons and cats, birds such as magpies, and snakes. Predators can also cause electrical short-circuits that can cause electrical faults or outages, damage power systems, and kill the predator. Faults caused by birds and other animals often trigger sensitive relay protection schemes, resulting in substation lockouts, interrupting service to thousands or possibly tens of thousands of customers and at the same time damaging expensive substation equipment.

Thus, in the field of electrical power transmission and distribution there is a need to insulate electrical power systems from short circuits caused by contact by birds and other animals. The variety and number of proposed solutions for repelling birds and other animals from electrocution risks highlights the persistence and magnitude of the problems created by such undesirable intrusion. Many different types of scarecrows and other moving devices have been developed to repel birds. In addition to moving devices, various physical structures often involving spikes or other physical barriers, have been developed to discourage birds from roosting on structures. Other bird repelling concepts use electricity or magnetic fields to discourage bird intrusion. Equipment shield and cage devices have been specifically designed to block birds and other animals from accessing and short-circuiting electrical leads, such as described in U.S. Pat. Nos. 5,153,383 and 5,485,307.

The inventor's own prior patent document discloses dielectric covers for protecting components of electrical power transmission systems, see United States patent publication no. 20080123254, as well as methods of making such protectors. Other protectors are available. In general, these protectors are hinged devices or similar configurations whose sections, when not fastened together in a closed position, are free to move relative to one another when the cover is handled or moved. Because the parts of the protector are free to move relative to one another, there results a lack of positive control that can make the protector difficult to install. Such protective covers generally require a minimum of two people to install remotely, and installation may be labor intensive. Using one hotstick lug built into the cover, one worker raises the cover into position, after which a second worker, using a second hotstick, closes the cover over the equipment to be protected and latches or otherwise fastens the cover in place. Because standard power company practice in many jurisdictions prohibits the simultaneous operation of more than one hotstick by one individual, each of these covers may therefore require a minimum of two people to install. Thus, an improved method and apparatus that allows dielectric covers to be easily installed on energized power equipment by a single user located outside the Limits of Approach may be advantageous.

Generally, the process of retrofitting electrical equipment with dielectric protective covers may be costly and may require powering down the system. Power down interruptions for the purpose of installing protective covers can keep a system down for a half a day or longer time periods, at great cost. Some systems are operated under the direction of a regulatory and scheduling authority that controls the system's downtime scheduling. In locations with minimal spare power transmission capacity, it can be a challenge for a system to get the downtime needed to install protective covers. Because electrical systems are usually scheduled for maintenance downtime on a fairly short notice (typically a week for non-emergency situations), and because scheduled downtime may be cancelled by the Regulatory Authority on an extremely short notice, there is no guarantee that a component protector will be installed during a system's available downtime period. As a result, a system can experience significant delays in protecting their equipment. Thus, in some cases it may not be feasible to de-energize electrical equipment in order to install covers and as a result covers may need to be installed remotely on energized equipment. In addition, remote installation may also be required on energized or non-energized equipment, including equipment that is difficult to access directly.

Referring to FIGS. 1 and 2, an apparatus 10 for protecting a component 12 of an electrical power transmission system 14 is illustrated. Apparatus 10 comprises a dielectric cover 16 and a spreader 18. Referring to FIG. 1, dielectric cover 16 has opposed portions 20, 22, that define a component enclosing space 23 at least when in a closed position as shown. Referring to FIG. 2, portions 20, 22 are illustrated as opened. Opposed portions 20 and 22 may form enclosing edges 24, 26. Dielectric cover 10 may have an open position in which enclosing edges 24, 26, of the opposed portions are like opened jaws and are spaced to allow entry of the component 12 between the enclosing edges 24, 26 into the dielectric cover 16. In some embodiments, the spreader is configured to exert positive control in use to hold the opposed portions 20, 22 in position over a range of positions between the closed position and an open position. Once the opposed portions 20, 22 of the cover 16 are opened to a partially or fully open position, the spreader 18 holds the cover 16 in the chosen position such that positive control is achieved and the cover 16 can be freely moved in space and positioned over the electrical equipment it is to protect without the risk or annoyance of accidental closure of the cover 16. Positive control reduces the chance that one or more portions of the cover 16 will accidentally contact nearby structures or equipment. When opened, the cover 16 may be placed at least partially over component 12 shown in FIG. 1. Referring to FIGS. 1 and 2, the spreader 18 is connected to, for example between, the opposed portions 20, 22 for moving, for example positively moving, the opposed portions 20, 22 into the closed position (shown in FIG. 1). When in the closed position, enclosing edges 24, 26 may protect the component 12 at least partially within the component enclosing space 23. For example, the edges 24, 26 may prevent the exit of the component 12 from space 23. Referring to FIG. 26, the closed position may not require that enclosing edges 24 and 26 actually touch. The closed position does not have to be a fully closed position but may be a partially closed position. Referring to FIGS. 1 and 2, the spreader 18 has a tool connector 28 for operation of the spreader 18 by a tool. The tool may be a hotstick 31 and the tool connector accommodates a hotstick. A conventional universal grip-all ("shotgun') hotstick may be used for this purpose, although other types of hotsticks may be used. Referring to FIGS. 3 and 4, the spreader 18 may be configured to move the opposed portions 20, 22 into the closed position (shown in FIG. 3) upon rotation of the tool connector 28. This may be the case when the spreader 18 comprises a bolt 32. The bolt 32, which may be part of a worm drive with a worm gear, may be threadably connected to one or more of portions 20, 22 (for example portion 22 as shown) such that rotation of the bolt 32 moves the connected portion relative to the bolt 32. For example, the bolt 32 may be connected to a swivel nut 34 (FIG. 4) on the opposed portion 22 that is furthest from the tool connector 28 (in this case portion 22). Swivel nut 34 is threaded to bolt 32 in the embodiment illustrated. The other of the opposed portions 20, 22, namely the opposed portion 20 that is nearest the tool connector 28 (in this case portion 20), may define a guide hole 36 for the bolt 32. The guide hole 36 may be defined by a swivel nut 38. The use of swivel nut(s) is particularly useful when the opposed portions 20, 22 are configured to pivot relative to one for example as shown, because as the portions pivot relative to one another, the bolt 32 will also pivot relatively. The bolt 32 may not be threaded along the entire bolt length. For example, bolt 32 may comprise a non-threaded portion 37 positioned to pass through swivel nut 38 (FIG. 4). Referring to FIG. 2, the guide hole 36 may also comprise a slot 40 for the bolt 32 to slide across. It should be understood that swivel nut 38 is not required in FIG. 2, since tool connector 28 would contact the edges of slot 40 upon rotation, compelling the portions 20, 22 together. However, using threaded swivel nuts on both portions 20 and 22 may allow the portions 20, and 22 to be closed and opened upon rotation of spreader 18.

Figure 11:
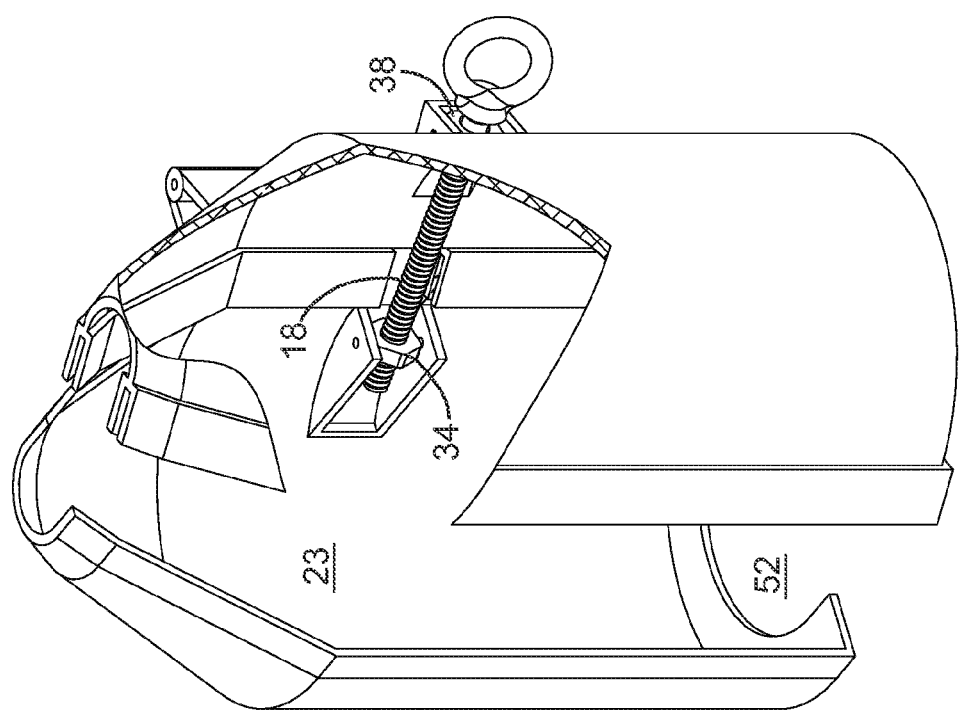

Referring to FIGS. 1 and 2, the apparatus 10 may further comprise a hinge 42 between the opposed portions 20, 22. The hinge may define a pivot axis 44 that is spaced outwardly, for example using flanges 57 and 59, from the component enclosure 23. Referring to FIGS. 3-4, this arrangement is also shown in a different embodiment. The spreader 18 may be connected to the opposed portions 20, 22 such that the spreader 18 is positioned between the component 12 and the pivot axis 44 in use (FIG. 3). Thus, the spreader 18 is located closer to the pivot axis 44 than the enclosing edge 24. The enclosing edges 24, 26 may at least partially overlap when in the closed position. Overlapping may be accomplished by a tongue 46 and groove 48 overlapping configuration, where one edge 26 forms the tongue 46 and the other corresponding edge 24 forms the groove 48 to effectively interlock in the closed position. A tongue in groove is effectively a double overlap, although a single overlap with two edges is possible as well. Overlapping configurations are advantageous because they increase the creepage distance for electrical current between edges 24, 26. If overlapping configurations are used, it may be advantageous for the pivot axis 44 to be spaced at some distance from space 23 (shown in FIG. 3). This is because spacing pivot axis 44 at some distance from space 23 allows portions 20 and 22 to pivot relative to one another over a smaller relative angle than if pivot axis 44 was placed where enclosing edges 24A and 26A are shown. This configuration is also advantageous because it allows enclosing edges 24A and 26A to be placed at what might otherwise be the location of hinge 42. Referring to FIG. 6, groove 48 or any overlapping edge 24 or 26 may be flared, for example by use of sloped sidewalls 54, 56. Sloped sidewalls 54, 56 may give a "wide mouth" configuration as shown. Flaring is advantageous because it allows portions 20 and 22 to align properly when portions 20 and 22 are pivoting relative to one another while the cover 16 is being rotated to closed. Referring to FIG. 3, enclosing edges 24 and 26 may surround the perimeter of portions 20 and 22 to enclose component 12, but edges 24 and 26 may be separated to define various openings when closed, such as opening 50. Referring to FIG. 11, a bottom opening 52 may also be defined as an example. Openings are understood to be provided for various parts of the transmission system to connect to component 12 as needed. Referring to FIG. 24, in some embodiments, edges 24 and 26 may comprise flanges 96 and 98, respectively, extending outwardly from cover 16.

Figure 43:
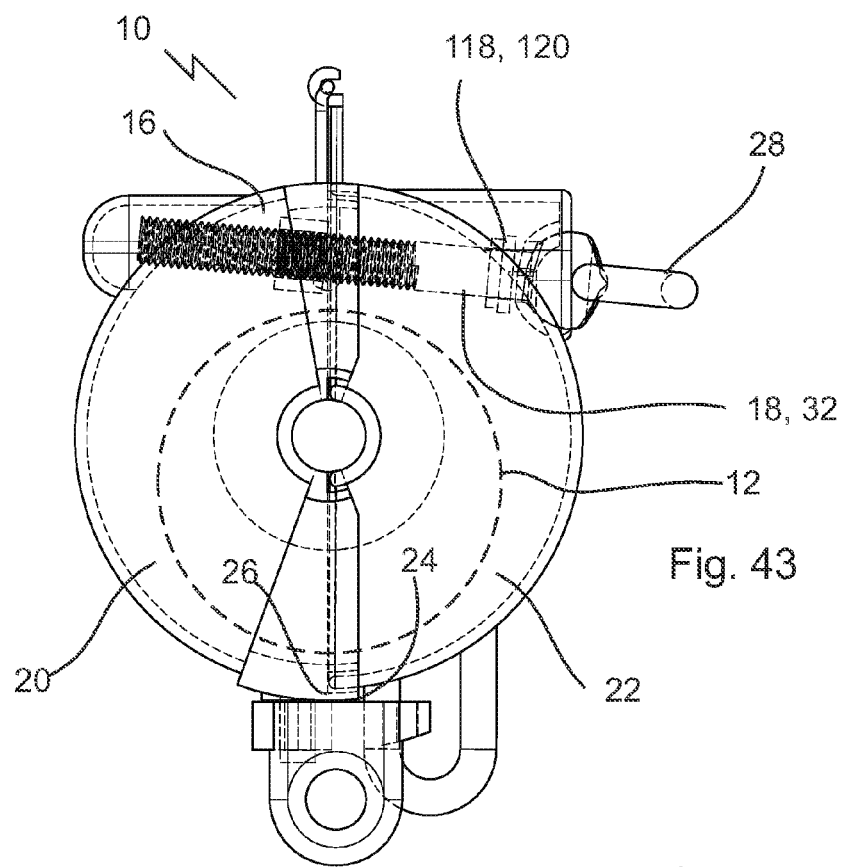
FIG. 43 is a top plan view of the dielectric cover of FIG. 41 positioned over a component and illustrating the internal components illustrated with ghost lines.

Referring to FIGS. 11 and 12, spreader 18 may be located at least partially inside the component enclosing space 23 at least when in the closed position. In some cases, spreader 18 is at least partially contained within the dielectric cover 16 when in the closed position as shown. Referring to FIG. 43, component 12 may be positioned between the spreader 18 and the outermost enclosing edges 24, 26 in use. In other embodiments spreader 18 may be constructed integrally with portions 20, 22. Referring to FIGS. 3 and 4, the spreader 18 may be located outside of the component enclosing space 23 at least when in the closed position. This may be advantageous, because more room is provided in space 23 if spreader 18 is not in it, and also there is less chance of electrical current creepage when spreader 18 does not pass into space 23. As shown in FIGS. 3 and 4, spreader 18 may be located between pivot axis 44 and enclosing edges 24A, 26A nearest pivot axis 44. Referring to FIGS. 5 and 6, however, spreader 18 may also be located further outward than pivot axis 44. In this embodiment, spreader 18 is mounted on peripheral flanges 58 and 60 extending outwardly from pivot axis 44. As shown, flanges 58 and 60 originate from portions 20 and 22, respectively, although this may be reversed.

Referring to FIG. 2, tool connector 28 is shown as an eyelet 63, although any suitable connector 28 may be used. For example, referring to FIG. 25, connector 28 is shown as a hook 61. Referring to FIG. 2, the connector 28 is configured to connect to the tool 30 used, which may be a dielectric hotstick as shown. By allowing connector 28 to connect to a hotstick, the cover 16 can be positioned and closed remotely, even when the transmission system 14 is energized.

Although FIG. 1 illustrates one embodiment of spreader 18, any suitable configuration of spreader 18 is possible. Referring to FIGS. 7 and 10, an embodiment is illustrated where spreader 18 comprises a pin 64 and lock 66. In this embodiment, one of pin 64 and lock 66 is attached to cover 16, which allows the other of pin 64 and lock 66 to be installed and locked in place to close portions 20 and 22. For example, lock 66 may be connected to flange 57, for example slid into a slot (not shown) that locks lock 66 in place. Then, pin 64 may be installed through guide holes (not shown) through flanges 57 and 59, and then passed through a slot 68 (shown in FIG. 9) in lock 66. One-way restrictive elements 70 on pin 64 allow pin 64 to be slid into lock 66, but prevent pin 64 from being slid backwards out of lock 66. Thus, by manipulating pin 64 with tool 30 (shown in FIG. 1), portions 20 and 22 can be moved into the closed position and locked in place. To open the cover 16, lock 66 must be removed, for example slid off of cover 16, and pin 64 removed. Referring to FIGS. 8 and 9, tool connectors such as eyelets 72 and 74 on pin 64 and lock 66, respectively, allow pin 64 and lock 66 to be manipulated remotely. Other suitable locking mechanisms may be used, for example a ratchet or hydraulic system.

Figure 13:
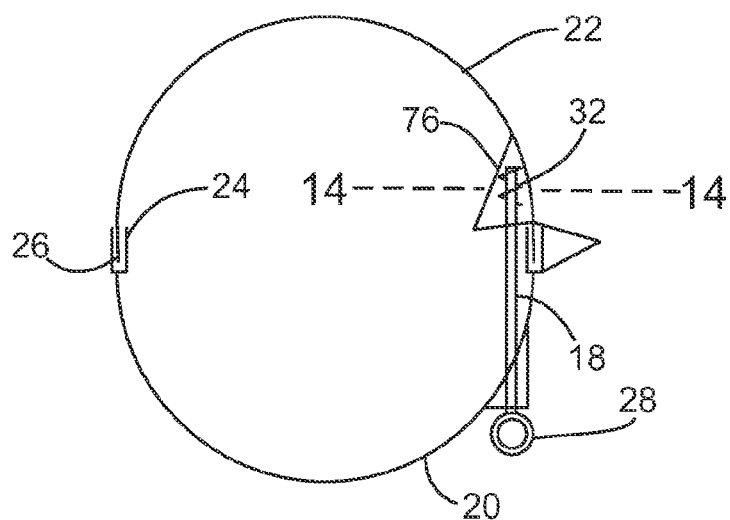
FIGS. 13 and 15 are top plan section views illustrating another embodiment of a dielectric cover for protecting a component of an electrical power transmission system, the apparatus having a spreader comprising a bolt.
Figure 14:
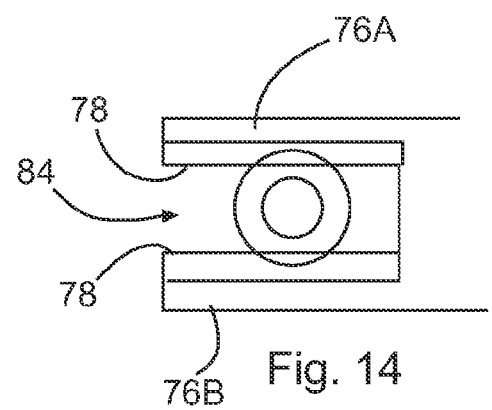
FIG. 14 is a section view taken along the 14-14 section lines from FIG. 13, and illustrates the connection between the first portion and the bolt.
Figure 15:
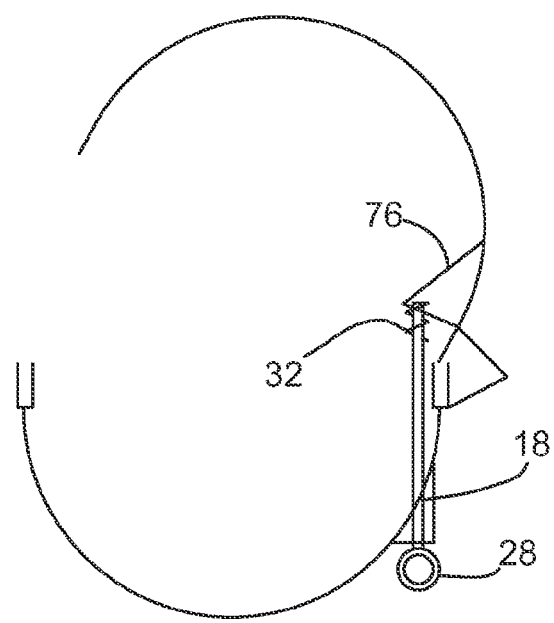
Figure 16:
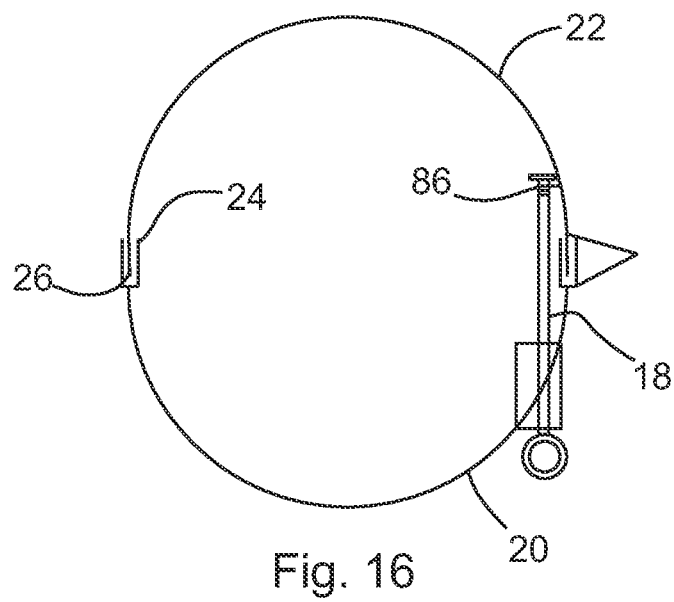
FIGS. 16 and 17 are top plan section views illustrating another embodiment of a dielectric cover for protecting a component of an electrical power transmission system, the apparatus having a spreader comprising a winch arrangement.
Figure 17:
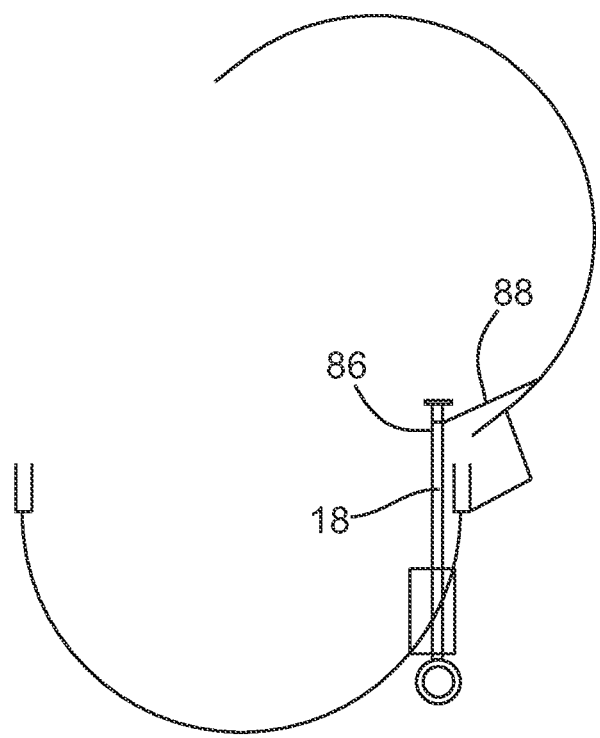
Figures 18, 19:
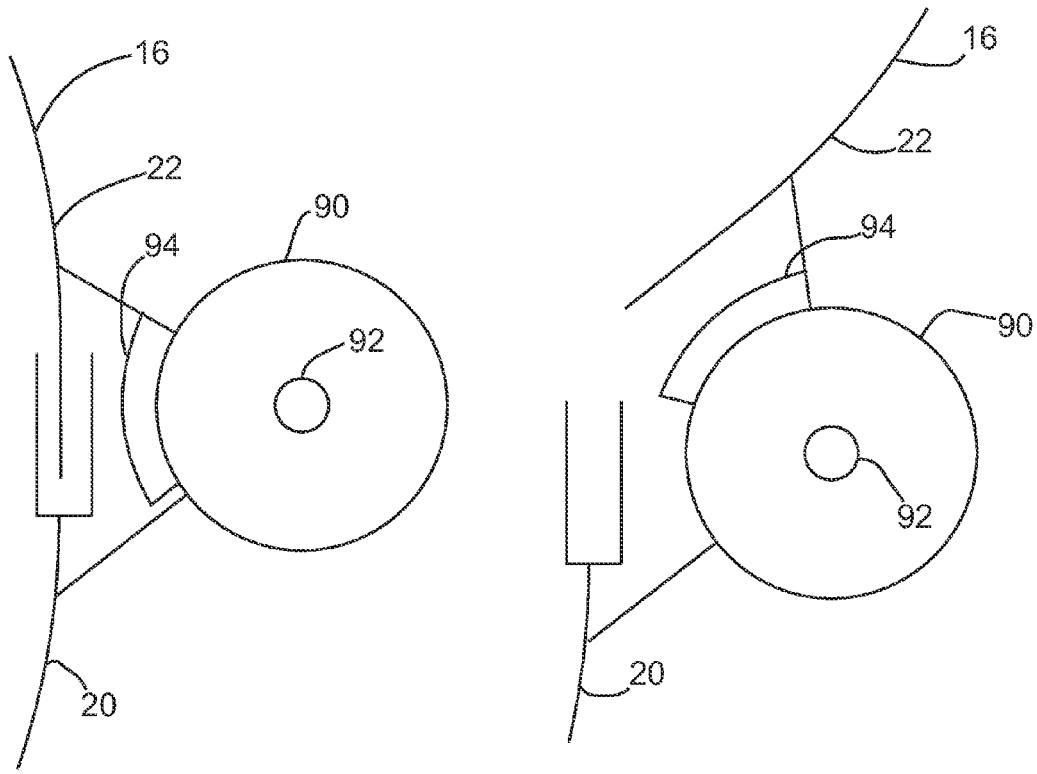
FIGS. 18 and 19 are top plan section views illustrating another embodiment of a dielectric cover for protecting a component of an electrical power transmission system, the apparatus having a spreader with a gear for opening and closing the portions.
Figure 20:
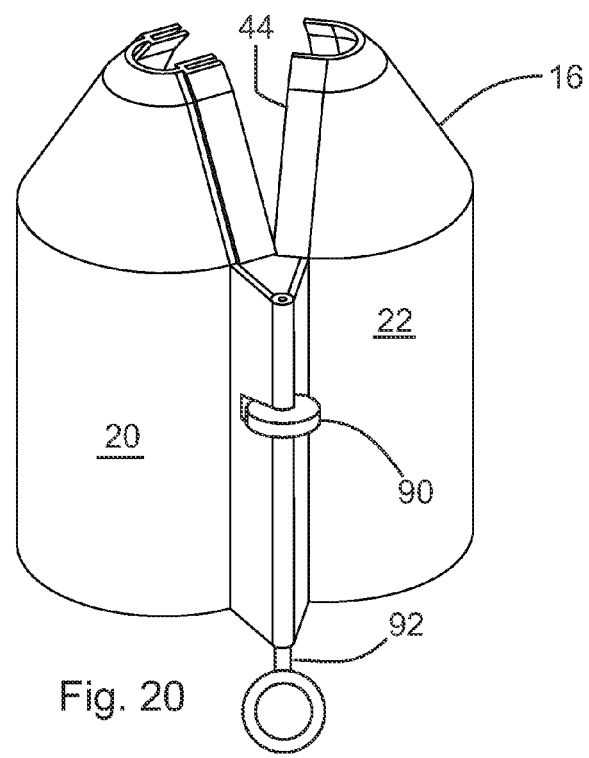
FIG. 20 is a perspective view of the embodiment of FIG. 18.
Figure 23:
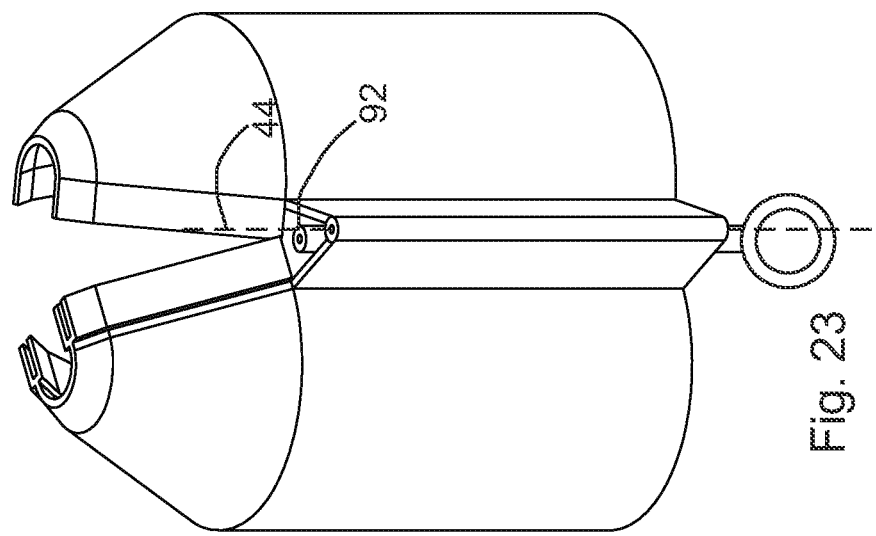
FIG. 23 is a perspective view of the embodiment of FIG. 21.
Figure 22:
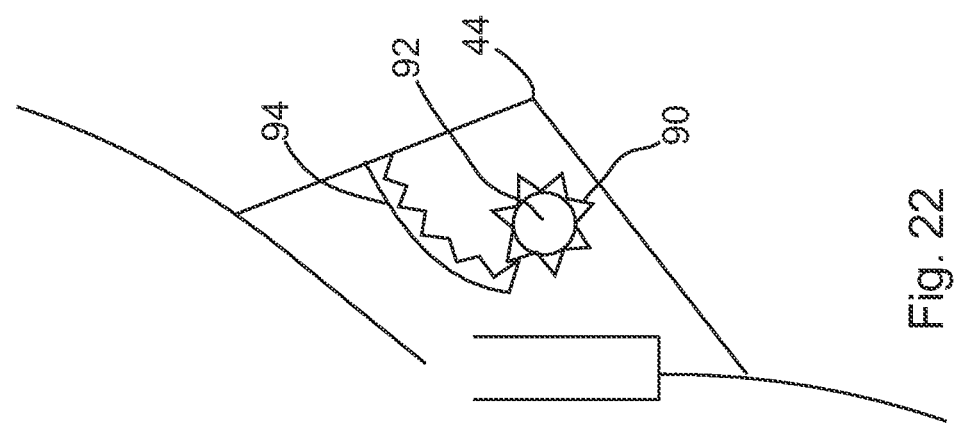
FIGS. 21 and 22 are top plan section views illustrating another embodiment of a dielectric cover for protecting a component of an electrical power transmission system, the apparatus having a spreader comprising a gear and threaded arm arrangement.
Figure 21:
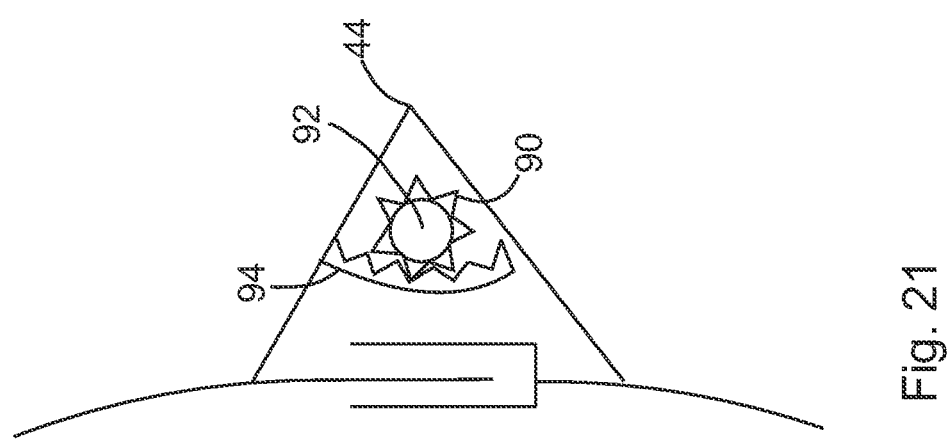

Referring to FIGS. 11 and 12, another embodiment of spreader 18 is shown located inside the component enclosing space 23. This embodiment operates much like the embodiment of FIG. 4, using swivel nuts 34 and 48. Referring to FIGS. 13 and 15, an embodiment of spreader 18 is shown where spreader 18 comprises a bolt and grooved swing plate arrangement. For example a bolt 32 engages one or more grooved swing plates 76 on the one of portions 20 and 22 furthest from the tool connector 28. Referring to FIG. 14, the swing plates 76 may comprise elongated grooves 78 disposed on upper and lower swing plates 76A and 76B, respectively. This allows bolt 32 to maintain threaded connection with the swing plates 76 even when portions 20 and 22 are pivoted relative to one another. The grooves 78 may be angled or curved for smoother operation during pivoting. Referring to FIGS. 16 and 17, another embodiment is shown where spreader 18 comprises a winch 86 arrangement. Winch 86 is connected by cable 88, thread, or other suitable connection to portion 22, and pulls portion 22 into the closed position shown in FIG. 16 when spreader 18 is rotated. Such an embodiment allows movement from open to closed, but does not give full positive control. Referring to FIGS. 18-20, another embodiment is shown where spreader 18 comprises a gear 90 and arm 94 arrangement. Gear 90 is mounted coaxially with a gear axis 92, which in this case also defines pivot axis 44 of cover 16. The gear ratio may be adjusted to reduce the force required to close portions 20 and 22. Gear 90 meshes with arm 94, for example a curved arm as shown, on one of portions 20, 22, while gear axis 92 is connected to the other of portions 20, 22. As gear axis 92 is rotated, gear 90 rotates and causes relative rotation between portions 20 and 22. In another embodiment, spreader 18 may comprise a worm drive with bolt 32 (not shown) replacing arm 94, bolt 32 meshing to gear 90, which would be a worm gear. Referring to FIGS. 21-23, an embodiment similar to the embodiment of FIGS. 18-20 is shown, except that gear axis 92 is spaced from pivot axis 44. In this embodiment, the threading is shown on gear 90 and curved arm 94.

Referring to FIG. 25, another embodiment of cover 16 is shown, with portions 20 and 22 provided as distinct portions connected together only by spreader 18. In this embodiment, when cover 16 is in place over component 12, spreader 18 may be operated using tool 30 (not shown) to close the cover 16. To do so, spreader 18 may comprise a bolt 32, and may be threadably attached to both of portions 20 and 22, although this is not required. FIG. 25 also demonstrates that portions 20 and 22 may be resilient enough to flex to allow component 12 to enter into component enclosing space 23. This is possible even if portions 20 and 22 are integrally connected together, for example without a hinge, if spreader 18 can maintain enclosing edges 24 and 26 sufficiently separated in the open position. Also, more than one spreader 18 may be used on a cover 16. In an embodiment not shown, portions 20 and 22 may be connected together, for example integrally connected together, at a location other than a hinge point, while a spreader 18 may still be used to open and close enclosing edges 24 and 26 over a component 12. Thus, although portions 20 and 22 are connected together, the flexibility of the cover 16 allows a portion of the cover 16 to be flexed open by the spreader 18 in order to accept a component before spreader 18 is used to close the cover 16.

Referring to FIGS. 1 and 2, the operation of apparatus 10 will now be described. Referring to FIG. 2, in a stage 100 (shown in FIG. 27), opposed portions 20, 22 of dielectric cover 16 are remotely positioned at least partially over component 12 (shown in FIG. 1). This may be accomplished by using a hotstick 31 connected to tool connector 28 to position the cover 16 in place. Referring to FIG. 1, in a stage 102 (shown in FIG. 27) the opposed portions are remotely closed by operating the spreader 18 using tool 30 connected in use to the tool connector 28 to at least partially enclose the component 12. As described above, in FIG. 1 rotation of the spreader 18 rotates bolt 32 and draws portions 20 and 22 together. A single tool connector 28 may be used to remotely position and operate spreader 18 to remotely close cover 16. This also allows a single installer to install cover 16.

Referring to FIG. 28, in some embodiments, one or more steps of the method such as remotely closing may be carried out while the electrical power transmission system 14 is energized. This is advantageous, because it allows cover 16 to be placed and installed with ease by a user 33 outside a safe Limit of Approach, for example Limit of Approach 89C. In some embodiments cover 16 may be remotely placed into a position inside a safe Limit of Approach when the electrical transmission system 14 is energized. This may be done by a single user 33, operating hotstick 31, who is in a position outside of a safe limit of approach. This allows cover 16 to be safely placed within the Limits of Approach. Standard Limits of Approach, for example limits of approach 89A-C are generally set by the IEEE for live electrical systems. It should be understood that the Limits of Approach may vary according to region. The limits of approach, referenced here by 89A-C around energized equipment generally widen as the voltage increases. For this purpose, hotstick 31 may be provided in a length that is suitable for the various Limits of Approach standards in all jurisdictions. Other suitable positioning techniques may be used, for example, anchoring, magnetic attachment, adhesive attachment, and attachment to a liveline tool, including suspending. In some embodiments, the component 12 comprises non-energized, for example grounded, electrical equipment that is located in close proximity to energized equipment of system 14 and thus lies within the Limit of Approach of the adjacent energized equipment. In some embodiments, the component 12 comprises energized or non-energized, for example grounded, electrical equipment that is located within system 14 in a spatial configuration that makes direct access difficult to accomplish.

In some embodiments, the method may further comprise positively moving the opposed portions 20, 22 from the closed position to an open position using the spreader 18. Thus, full positive control may be realized by the ability to positively control movement from open to closed and back to open. The method may comprise opening, for example remotely opening, the opposed portions 20 and 22 by operating the spreader 18 using a tool such as tool 30 connected in use to the tool connector 28 to remove, for example nondestructively, the dielectric cover 16 from the component 12. Of course, the tool 30 may be disconnected from the tool connector 28 in between stages. Remote removal of the cover 16 is advantageous for the same reasons remote installation is advantageous, and can be done while the system 14 is energized as well. Remote removal is also an improvement over prior covers that cannot be remotely removed. Nondestructive removal is also an improvement over prior covers which cannot be removed without damaging the cover. Allowing removal of cover 16 allows the cover 16 to be re-used.

In some embodiments, at least a portion of the spreader 18 is configured to be removed, for example remotely, from the apparatus after the cover 16 is installed and fastened in place. Removing the spreader 18 may be advantageous as it removes a potential perch point for birds or other small animals. This may be accomplished by modifying the spreader bolt threads, such that when the bolt is aligned in a certain way, it cam be pulled free of the installed cover.

Referring to FIG. 7, in some embodiments, for example those involving removal of at least a portion of the spreader 18, the apparatus 10 may comprise a lock 93 used to secure, for example to positively engage, the portions 20, 22 in order to hold the cover in a closed position. The lock may comprise a pin and slot, cam lock, eyelet and lock, latching mechanism, Velcro™ strips 95 and 97 as shown, or other suitable mechanisms. The lock 93 may be configured to be remotely operated, for example by a hotstick 31 held by a user located inside or outside the Limits of Approach. For example a hook 99 may be provided on strip 95 for a hotstick (not shown) to connect to.

Figure 33:
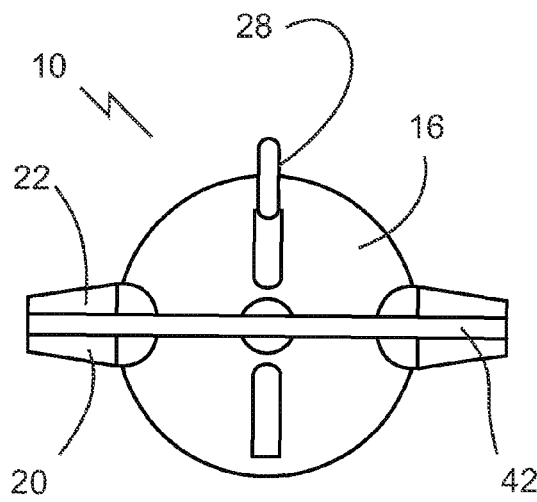
FIGS. 33-36 are top plan, perspective, side elevation and end elevation views, respectively, of an embodiment of a dielectric cover for protecting a lightning arrestor.
Figure 34:
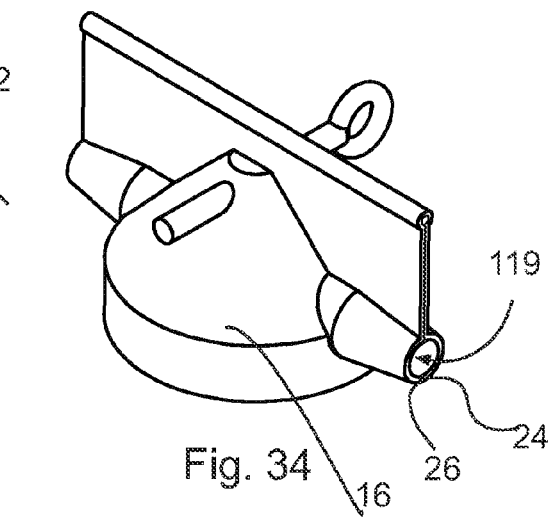
Figure 35:
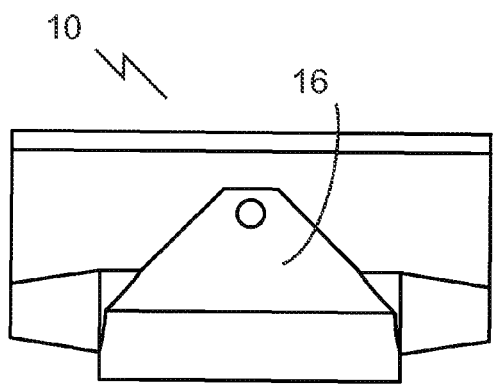
Figure 36:
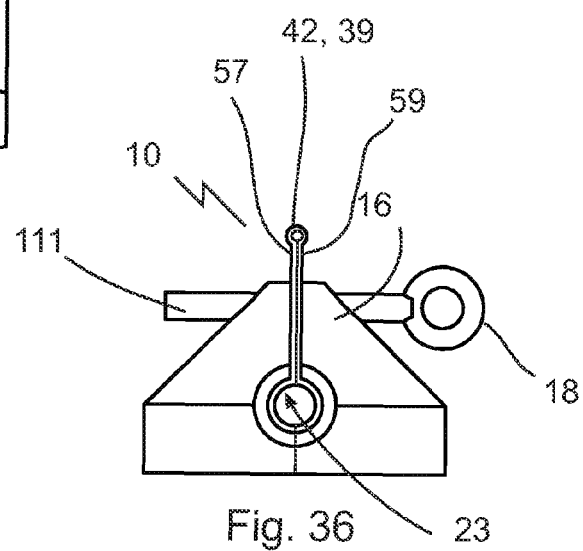
Figure 37:
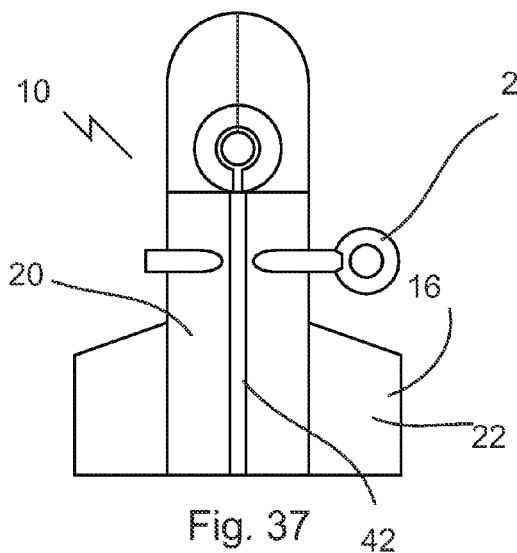
FIGS. 37-40 are top plan, perspective, end elevation and side elevation views, respectively, of an embodiment of a dielectric cover for protecting a switch.
Figure 38:
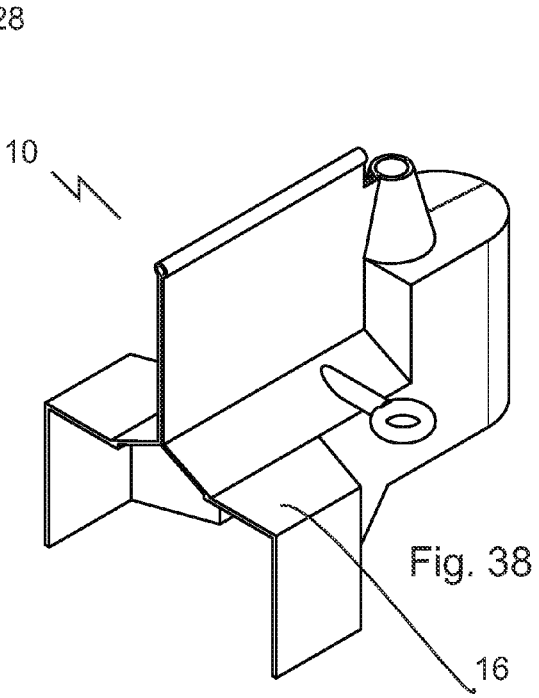
Figure 39:
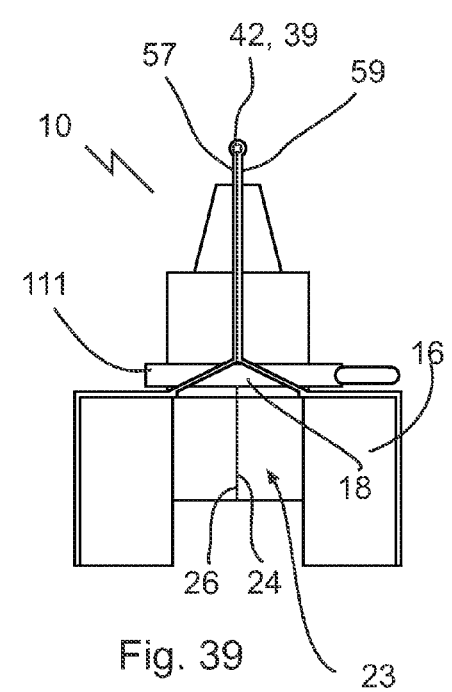
Figure 40:
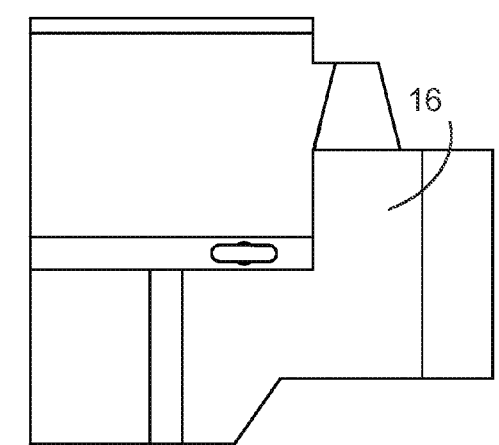

Referring to FIGS. 29-40, although most of the dielectric covers 16 illustrated in this document are shaped to fit bushings (not shown) for pole-mounted transformers, dielectric covers 16 may be made to fit other components of an electrical power transmission system. FIGS. 29, 33 and 37 indicate locations of the tool connector 28, opposed portions 20, 22, and the hinge 42. FIGS. 32, 36, and 39 illustrate that hinge 42 may be a living hinge, which may further be formed of a semi-circular extension 39. FIGS. 30, 34, and 39 illustrate enclosing edges 24 and 26. Hinge 42 may be spaced from component enclosing space 23 by cooperating flanges 57 and 59. Spreader 18 may extend at least partially when in the closed position as shown into a runoff chamber 111 extending off of the component enclosing space 23. FIGS. 29-32 illustrate an embodiment of a dielectric cover 16 shaped to fit a pin-style pole top insulator (not shown). FIGS. 33-36 illustrate an embodiment of a dielectric cover 16 shaped to fit a lightning arrestor (not shown). FIGS. 37-40 illustrate an embodiment of a dielectric cover 16 shaped to fit a switch. Covers 16 may be shaped to fit other components, such as pole-mounted transformers, dead end covers, and ampact covers.

Figure 41:
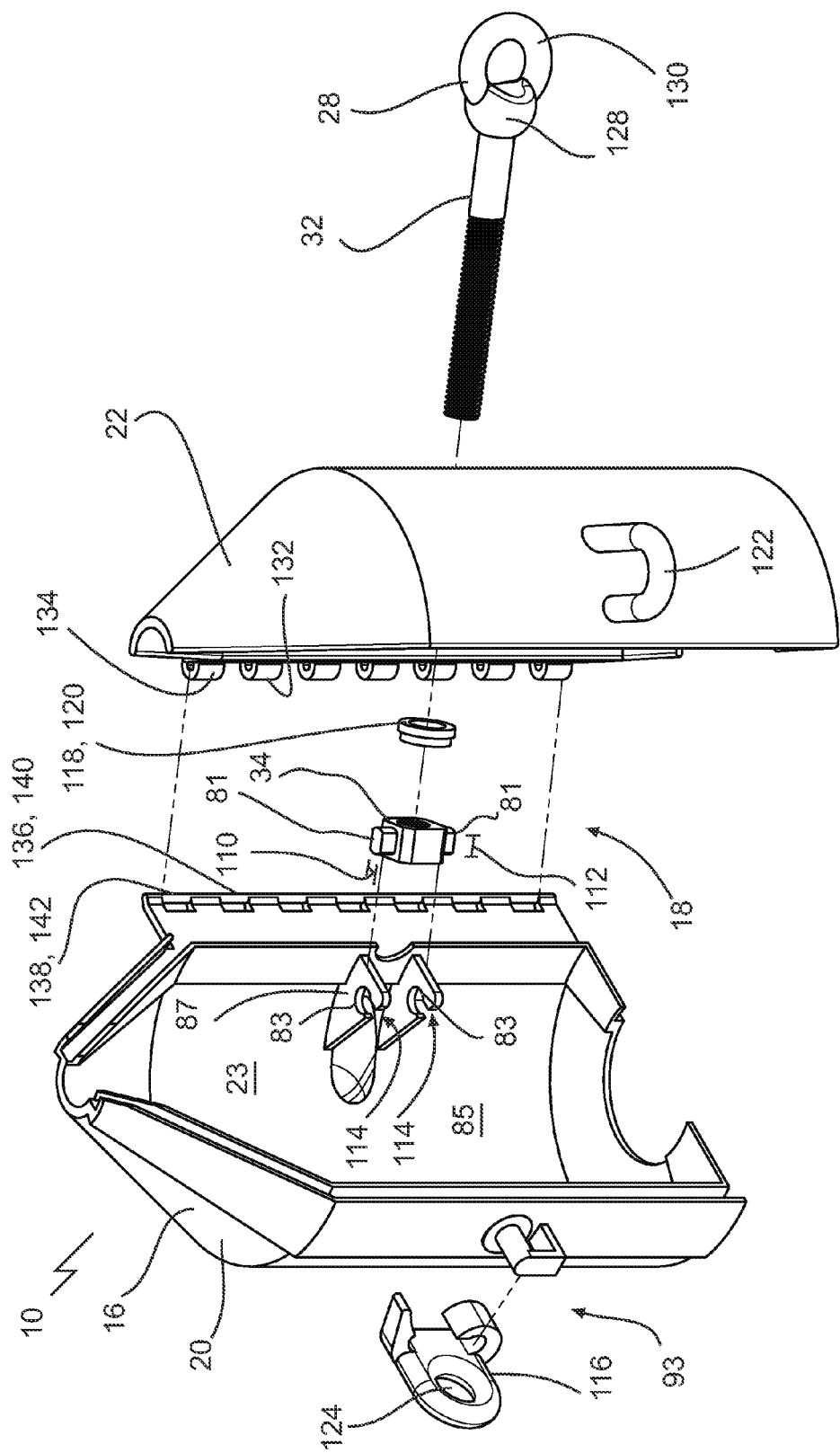
FIG. 41 is an exploded front perspective view of a further embodiment of a dielectric cover.
Figure 44:
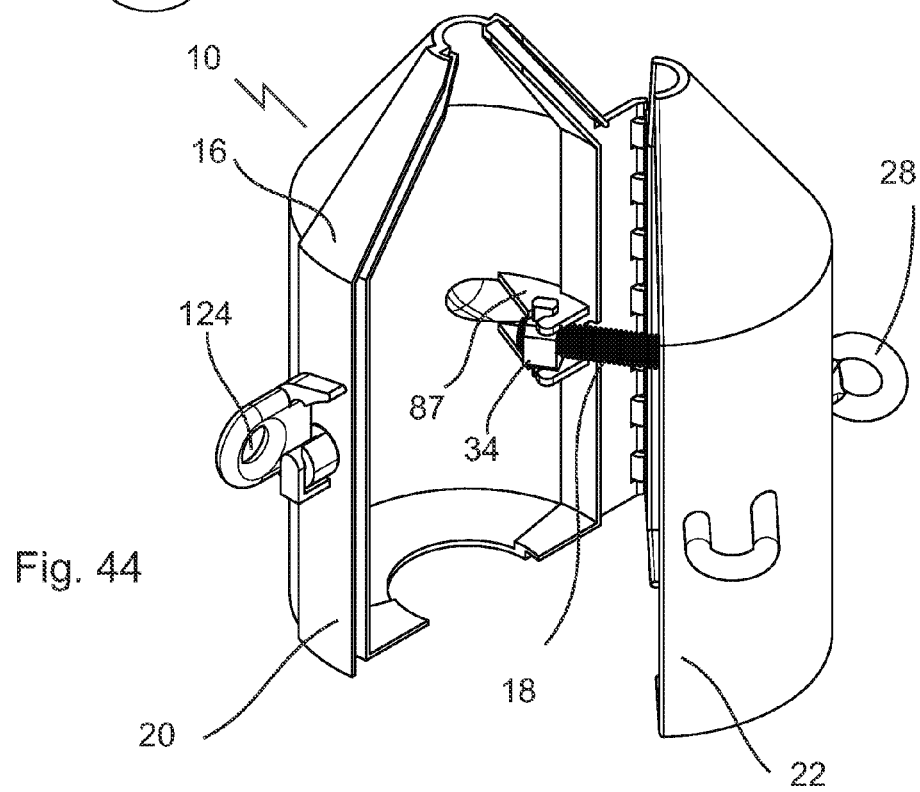
FIGS. 44-46 are perspective views of the dielectric cover of FIG. 41 in the open, closed but not latched, and closed and latched positions, respectively.

Referring to FIGS. 41-46 another embodiment of a dielectric cover 16 shaped to fit a bushing (not shown) is illustrated. FIG. 41 illustrates an exploded view denoting opposed portions 20, 22, spreader 18, bolt 32, tool connector 28, and swivel nut 34. FIG. 41 illustrates an example of a method of fitting swivel nut 34 into for example a bracket 87 in the interior wall 85 of space 23 by virtue of an axial pin 81 and slot 83 configuration. Thus, each axial pin 81 has a narrow lateral profile 110 shaped to allow insertion of each axial pin 81 into a slot 83 when the narrow lateral profile 110 is aligned with an entrance 114 into slots 83, and a wide lateral profile 112 shaped to allow rotation of axial pins 81 within slots 83 while preventing exit of pins 81 from slots 83 in all directions except when narrow lateral profile 110 is aligned with entrance 114. FIG. 44 illustrates swivel nut 34 mounted in bracket 87 such that swivel nut 34 must be rotated to be removed.

Referring to FIG. 41, tool connector 28 may have a bulbous exterior shape, for example a bulbous eyelet 130 and a bulbous portion 128 connecting eyelet 130 to bolt 32. A bulbous or bubble exterior shape may deter birds from perching on the tool connector 28. Bulbous parts of tool connector 28 may be sized small enough to prevent perching, may not have contours and surfaces that are easily gripped by a bird or other animal, and may be formed entirely around bolt 32 in order to achieve the same anti-perching function at any degree of rotation of bolt 32. In addition, bulbous shapes may protect the bolt from the elements and from debris that might impair the workings of the spreader 18.

FIG. 43 illustrates that apparatus 10 may positively move the opposed portions 20, 22 from the closed position shown to an open position (shown in FIG. 44 for example) using the spreader 18. For example, the bolt 32 may comprise a flange 118 positioned to bear against the opposed portion 22 nearest the tool connector 28 for allowing the spreader 18 to positively move the opposed portions 20, 22 through a range of positions from closed to open to give full positive control. FIG. 41 illustrates that flange 118 may be defined by a nut 120 on bolt 32. Flange 118 may also be a partial flange (not shown) such as a lateral extension off of bolt 32. Other suitable mechanisms for allowing positive movement while opening may be used. The use of flange 118 may also restrain the tool connector 28 from extending further out of the cover 16 than as shown in FIG. 43, thus reducing the attractiveness of tool connector 28 as a perch for birds or animals. In this and other embodiments spreader 18 cannot be separated from the dielectric cover 16 by operation of the tool connector 28 alone. Thus, the cover 16 is prevented from jarring free of the tool connector 28, which may otherwise cause the installer to drop the cover 16 onto equipment below. This may reduce the chance that the cover 16 will be accidentally dropped into a potentially hazardous situation. This contrasts with some existing covers, for which the tool connector may be a snap-on fastener that may come loose during installation.

Figure 47:
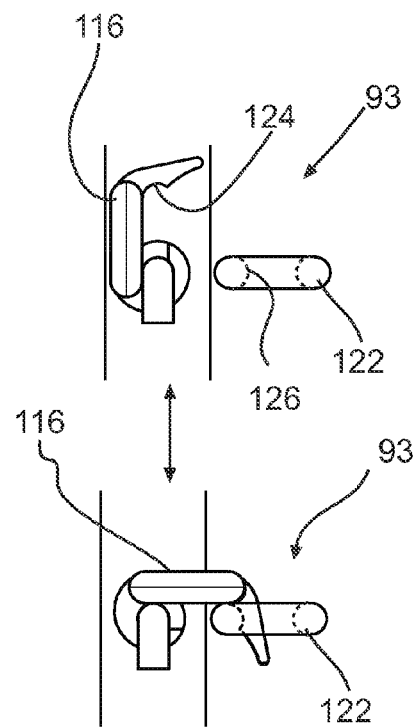
FIG. 47 is a sequence of end elevation views that illustrate the operation of the embodiment of a latch used in the dielectric cover of FIG. 41.

FIG. 41 also illustrates an example of a lock 93 comprising a latch 116. Latch 116 may be mounted on portion 20, while a corresponding staple 122 or other latch coupler is mounted on the other portion 22. As discussed above, lock 93 may be remotely operated, for example by providing an eyelet 124 in latch 116 to be gripped by a hotstick 31 (not shown). FIG. 47 illustrates the operation of lock 93. Latch 116 has a grip surface 124 countoured to fit and snap over a corresponding latch surface 126 of staple 122. Other suitable latching mechanisms may be used.

Figure 42:
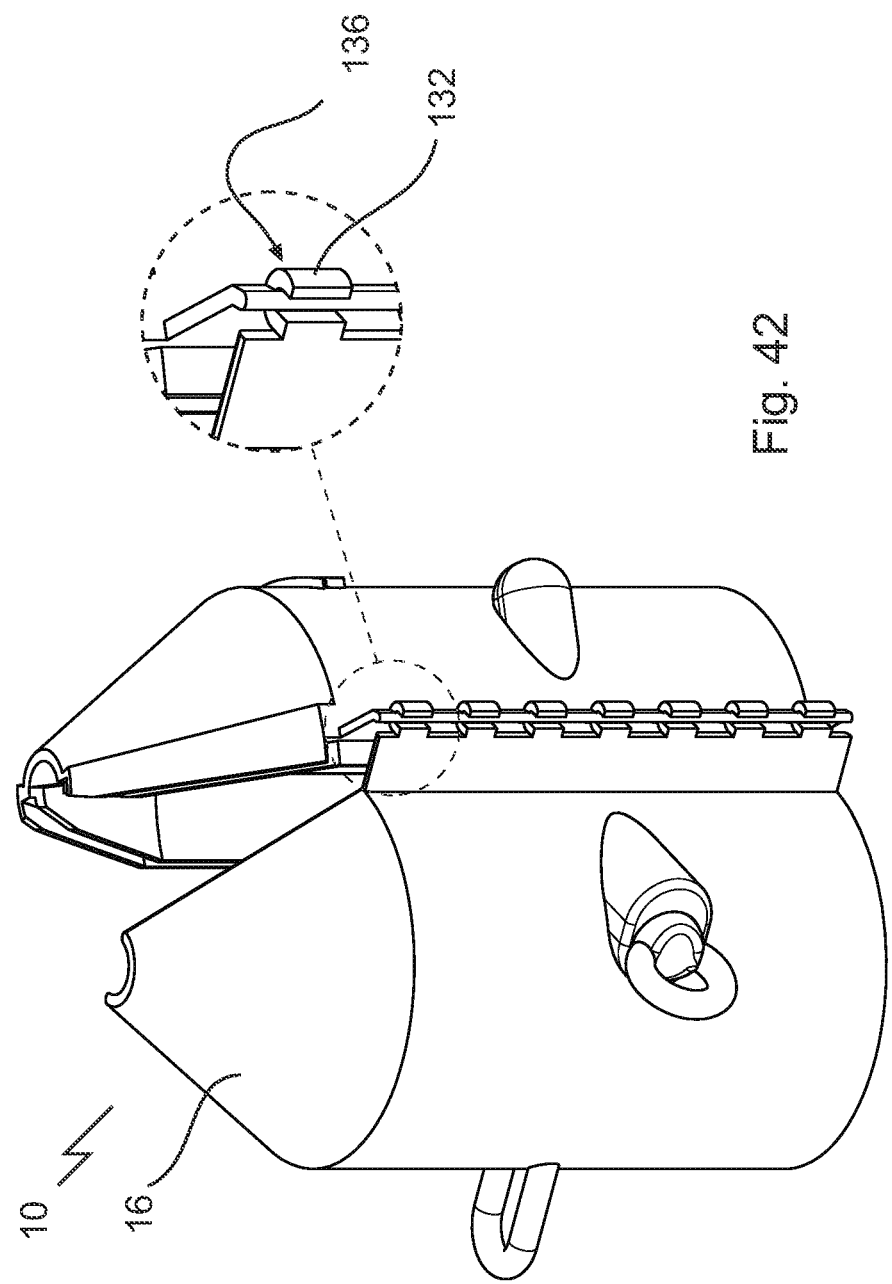
FIG. 42 is a rear perspective view of the dielectric cover of FIG. 41 with a close-up of the hinge connection between the opposed portions.

Referring to FIG. 41, the hinge 42 may allow easy separation of the opposed portions 20 and 22 at the hinge point. The hinge 42 may be formed by one or more open ended hooks, for example hooks 132, 134, on one of the opposed portions 22 and one or more corresponding bearing surfaces, for example surfaces 136, 138, respectively, on the other of the opposed portions 20. FIG. 42 illustrates a close up of one open ended hook 132 engaging a corresponding bearing surface 136. Referring to FIG. 41, the corresponding bearing surfaces 136, 138 may be formed by a series of windows 140, 142, respectively in portion 20. Bearing surfaces 136, 138 may be curved or contoured to allow smooth pivoting of hooks 132, 134 about surfaces 136, 138. Hinge 42 may be a piano hinge as shown.

Figure 45:
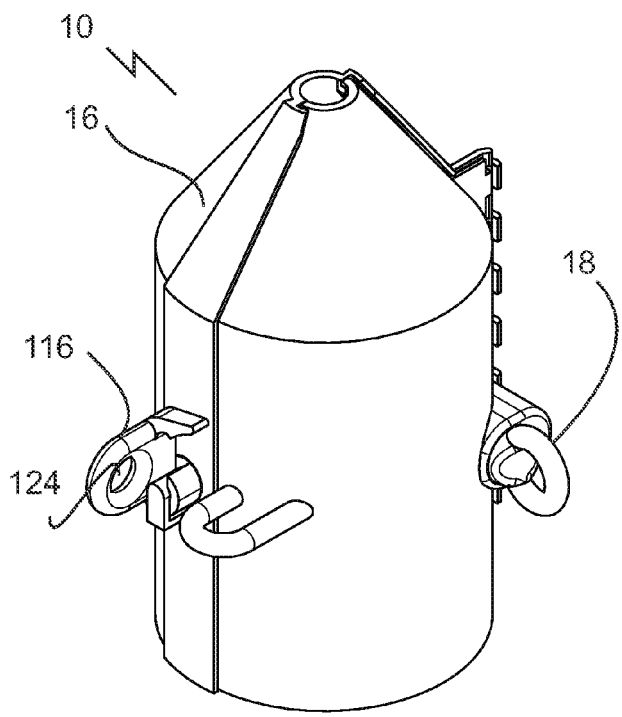
Figure 46:
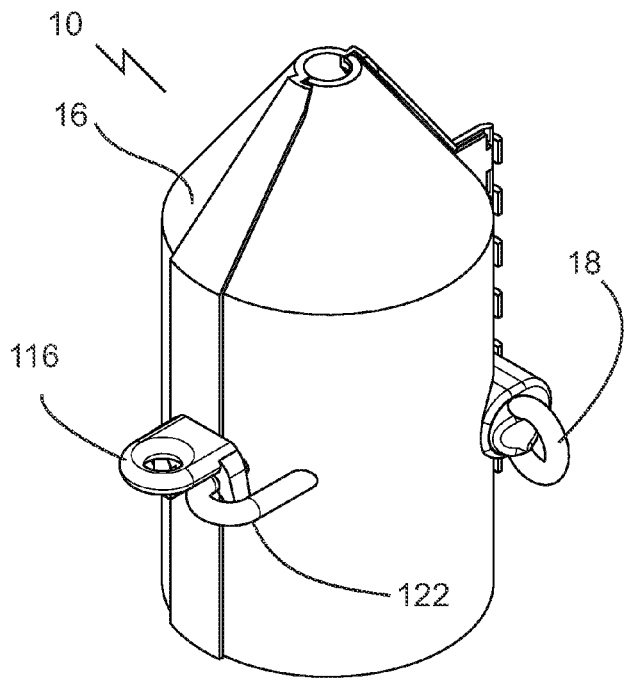

The sequence from FIGS. 41, and 44-46 illustrates operation of apparatus 10. Operation by a single user will now be described. In FIG. 41, the components of apparatus 10 are assembled to give the opened cover as shown in FIG. 44. The spreader 18 may be in an opened position such as the position of maximum opening of portions 20, 22. It is at this stage that the user may position cover 16 over a component (not shown) to be protected, for example by remotely manipulating cover 16 with a hotstick (not shown) connected to tool connector 28. FIG. 45 illustrates cover 16 in the closed position, after spreader 18 has been remotely operated with the hotstick to close cover 16 over a component (not shown). Spreader 18 may be closed by the user remotely manipulating spreader 18 by virtue of a hotstick (not shown) connected to the tool connector 28. The user may then disconnect the hotstick from tool connector 28, and reconnect the hotstick to eyelet 124 to close latch 116. FIG. 46 illustrates cover 16 after latch 116 has been remotely secured to staple 122 to lock the cover 16 in place. Once the cover 16 is latched, the user may further tighten the spreader 18 if desired. To remove the cover 16, the user may follow the reverse of the sequence from FIGS. 46-44.

Although installation by a single user is disclosed above, dual user operation will now be described to emphasize that more than one user may install or remove any of the embodiments described herein. In FIG. 41, the components of apparatus 10 are assembled to give the opened cover as shown in FIG. 44. The spreader 18 may be in an opened position such as the position of maximum opening of portions 20, 22. It is at this stage that the first user may position cover 16 over a component (not shown) to be protected, for example by remotely manipulating cover 16 with a hotstick (not shown) connected to eyelet 124 or tool connector 28. FIG. 45 illustrates cover 16 in the closed position, after spreader 18 has been remotely operated to close cover 16 over a component (not shown). Spreader 18 may be closed by the second user remotely manipulating spreader 18 by virtue of a hotstick (not shown) connected to the tool connector 28, while the first user remotely maintains cover 16 in position via eyebolt 124. At this point, latch 116 may be secured. FIG. 46 illustrates cover 16 after latch 116 has been remotely secured to staple 122 to lock the cover 16 in place. The first user may remotely secure latch 116 into the position shown in FIG. 46 by remote manipulation of latch 116, while the second user controls the position of the cover 16 by remote manipulation of tool connector 28. Once the cover 16 is latched, the second user may further tighten the spreader 18 if desired. To remove the cover 16, the user or users may follow the reverse of the sequence from FIGS. 46-44. Again, removal may be accomplished by one or more users.

Embodiments have been shown with two portions 20 and 22, but more than two portions are possible, for example 3 or 4 or more. Further, a spreader 18 may be incorporated between each pair of portions. This way, cover 16 may be positioned in place, and each spreader individually operated until cover 16 is closed. It should also be understood that embodiments may comprise a variety of cover shapes other than that shown in the drawings. In some embodiments (not shown), portions 20 and 22 do not have enclosing edges. Thus, portions 20 and 22 may be integrally connected, and spreader 18 may be used to reduce the inner volume of space 23 in order to fit cover 16 around a component. An example of such an embodiment is a sleeve.

Portions 20 and 22 may be biased towards the closed position or the open position, for example using resiliency of material, or a biasing mechanism such as a spring. Spreader 18 may act against the biasing force, in order to afford positive control over the positioning of the portions 20, 22.

Cover 16 and spreader 18 may be made of any suitable dielectric material, such as polyurethane. Spreader 18 may be made in part or full from a variety of materials, some of which may be dielectric. Although a bolt 32 is illustrated in most embodiments, other suitable spreaders may be used, such as spreaders that comprise a screw.

It should be understood that remote operation is not required in all embodiments. Thus, a user may install a cover as disclosed herein by directly installing the cover, for example while the system is de-energized.

A hotstick (not shown) may be used with a drive for driving the tool connector 28. For example, the hotstick may comprise a drive train for transferring rotational energy between tool connector 28 and a power source at a user end of the hotstick. A suitable power source may comprise a battery or an electric drill. Human power may also be used. For example, in the simplest example a universal grip-all ("shotgun") hotstick may be rotated to rotate the tool connector 28. In other embodiments the hotstick may comprise an outer gripping sleeve concentrically and rotatably attached to the hotstick stock, and a lever laterally extending from the hotstick stock for allowing a user to hold and steady the hotstick with one hand on the rotatable sleeve, while the other hand may be used to rotate the hotstick stock by operation of the lever.

Not all the covers 16 described herein may hold themselves in place on or around the component 12 by closing the cover 16 around the component 12. For example, the lightning arrestor cover (FIG. 34) and the pin insulator cover (FIG. 30) may not close entirely around the component (not shown), except that the ports 119 may close around the conductors (not shown) leading in and out of the component, thus maintaining the cover in place. In other cases fasteners (not shown) may be used to secure cover 16 in place.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus for protecting a component of an electrical power transmission system, the apparatus comprising:
a dielectric cover having opposed portions that each have an interior wall surface and an exterior wall surface, the interior wall surfaces being shaped to define a component enclosing space at least when in a closed position; and
the dielectric cover having a spreader connected to the opposed portions for positively moving the opposed portions through a range of positions from open to closed, in which at each position in the range of positions the spreader is connected to hold the opposed portions in place relative to one another or move the opposed portions to an adjacent position in the range of positions to provide, during use, the ability to precisely control the movement and position of the opposed portions to reduce the chance that one or more of the opposed portions will accidentally contact nearby structures or equipment, the spreader having an opposed portion connector and a tool connector, the tool connector being for operation of the spreader by a tool, the tool connector being positioned on or extended from the exterior wall surface of one of the opposed portions, with the opposed portion connector passing through a hole from the exterior wall surface to the interior wall surface of the one of the opposed portions and connecting to the other of the opposed portions such that the opposed portion connector is at least partially contained within the dielectric cover when the dielectric cover is in the closed position.

2. The apparatus of claim 1 in which the spreader cannot be separated from the dielectric cover by operation of the tool connector alone.

3. The apparatus of claim 1 in which the spreader comprises a pin and lock.

4. The apparatus of claim 1 in which the tool is a hotstick, and the tool connector accommodates the hotstick.

5. The apparatus of claim 1 in which the spreader is configured to move the opposed portions into the closed position upon rotation of the tool connector.

6. The apparatus of claim 5 in which the spreader further comprises a bolt.

7. The apparatus of claim 6 in which the bolt is connected to a swivel nut on one of the opposed portions furthest from the tool connector.

8. The apparatus of claim 6 in which the one of the opposed portions nearest the tool connector defines a guide hole for the bolt.

9. The apparatus of claim 8 in which the guide hole is defined by a swivel nut.

10. The apparatus of claim 6 in which the bolt comprises a flange positioned to bear against the one of the opposed portions nearest the tool connector for allowing the spreader to positively move the opposed portions through a range of positions from closed to open to give full positive control.

11. The apparatus of claim 10 in which the flange is defined by a nut on the bolt.

12. The apparatus of claim 6 in which the bolt has a threaded portion and an unthreaded portion, the tool connector comprising the unthreaded portion, and the opposed portion connector comprising the threaded portion.

13. The apparatus of claim 1 in which the tool connector comprises an eyelet or a hook.

14. The apparatus of claim 13 in which the tool connector has a bulbous exterior shape.

15. The apparatus of claim 1 in which the opposed portions are configured to pivot relative to one another.

16. The apparatus of claim 15 in which the apparatus further comprises a hinge between the opposed portions.

17. The apparatus of claim 16 in which the hinge defines a pivot axis that is spaced outwardly from the component enclosing space.

18. The apparatus of claim 16 in which the hinge is formed of one or more open ended hooks on one of the opposed portions and one or more corresponding bearing surfaces on the other of the opposed portions.

19. The apparatus of claim 16 in which the hinge comprises a piano hinge.

20. The apparatus of claim 15 in which the spreader is connected to the opposed portions such that the spreader is positioned between the component and the pivot axis in use.

21. The apparatus of claim 1 in which the opposed portions form enclosing edges that are:
spaced to allow entry of the component when the dielectric cover is in an open position; and
closed to protect the component at least partially within the component enclosing space when the dielectric cover is in the closed position.

22. The apparatus of claim 21 in which the enclosing edges at least partially overlap when the dielectric cover is in the closed position.

23. The apparatus of claim 22 in which the enclosing edges comprise a tongue and groove overlapping configuration.

24. The apparatus of claim 1 in which the spreader is located at least partially inside the component enclosing space at least when the dielectric cover is in the closed position.

25. The apparatus of claim 1 in which at least a portion of the spreader is configured to be remotely removed when the dielectric cover is in the closed position.

26. The apparatus of claim 1 in which the apparatus comprises a lock for securing the opposed portions in the closed position.

27. The apparatus of claim 26 in which the lock is configured to be operated remotely.

28. The apparatus of claim 1 in which the spreader comprises one or more of a gear and arm arrangement, a worm drive, a winch and cable, and a bolt and grooved swing plate arrangement.

29. The apparatus of claim 1 in which the spreader is connected to the opposed portions for positively moving the opposed portions through a range of positions from closed to open to give full positive control.

30. The apparatus of claim 1 in which an end of the opposed portion connector is contained within the dielectric cover when the dielectric cover is in the closed position.

31. The apparatus of claim 30 in which the opposed portion connector is entirely contained within the dielectric cover when the dielectric cover is in the closed position.

* * * * *